(12) United States Patent
Kim et al.

(10) Patent No.: US 10,863,850 B2
(45) Date of Patent: Dec. 15, 2020

(54) ELECTRIC COOKER

(71) Applicant: CUCKOO ELECTRONICS CO., LTD., Yangsan-si (KR)

(72) Inventors: Won Young Kim, Busan (KR); Won Joo Kim, Yangsan-si (KR); Seung Yun Kim, Busan (KR); Jun Seok Oh, Yangsan-si (KR)

(73) Assignee: CUCKOO ELECTRONICS CO., LTD., Yangsan-si (KR)

( * ) Notice: Subject to any disclaimer, the term of this patent is extended or adjusted under 35 U.S.C. 154(b) by 314 days.

(21) Appl. No.: 16/047,167

(22) Filed: Jul. 27, 2018

(65) Prior Publication Data
US 2019/0069706 A1   Mar. 7, 2019

(30) Foreign Application Priority Data

Sep. 7, 2017 (KR) .......................... 10-2017-0114591

(51) Int. Cl.
*A47J 27/08* (2006.01)
*A47J 27/086* (2006.01)
*A47J 27/00* (2006.01)

(52) U.S. Cl.
CPC ......... *A47J 27/0802* (2013.01); *A47J 27/004* (2013.01); *A47J 27/086* (2013.01); *A47J 27/0813* (2013.01)

(58) Field of Classification Search
CPC ............... A47J 27/0802; A47J 27/0813; Y10T 137/87877; Y10T 137/7909; Y10T 137/7913; Y10T 137/7921; F16K 15/18
USPC ........... 219/431, 440; 99/337, 338; 220/316; 137/883, 533, 533.17, 534; 251/231, 232
See application file for complete search history.

(56) References Cited

U.S. PATENT DOCUMENTS

| | | | | |
|---|---|---|---|---|
| 4,438,324 A | * | 3/1984 | Narita | A47J 27/62 219/433 |
| 4,627,417 A | * | 12/1986 | von der Becke | C08G 18/4252 126/369 |
| 6,283,014 B1 | * | 9/2001 | Ng | A47J 27/0802 219/431 |
| 7,148,451 B2 | * | 12/2006 | Miyake | A47J 27/004 219/440 |
| 7,935,914 B2 | | 5/2011 | Imura | |
| 10,589,729 B2 | * | 3/2020 | Aydemir | B60T 11/34 |
| 2006/0112834 A1 | | 6/2006 | Imura | |

(Continued)

FOREIGN PATENT DOCUMENTS

| | | |
|---|---|---|
| CN | 101554288 | 10/2009 |
| CN | 102835904 | 12/2012 |
| CN | 104114066 | 10/2014 |

(Continued)

*Primary Examiner* — Michael A Laflame, Jr.
(74) *Attorney, Agent, or Firm* — Lex IP Meister, PLLC

(57) ABSTRACT

An electric cooker is configured to cook food in a pressurized state and a non-pressurized state of an inner pot, thereby improving the cooking quality and convenience of use. The electric cooker includes a main body having an inner pot configured to accommodate food and a heating unit; a lid coupled to an upper portion of the main body and opened/closed by an opening/closing unit; and a pressure switching selection unit arranged to pass through the lid and configured to switch or maintain opened/closed states to discharge internal steam from the inner pot by interworking with the opening/closing unit.

18 Claims, 12 Drawing Sheets

(56) References Cited

U.S. PATENT DOCUMENTS

2016/0345766 A1* 12/2016 Sapire ................. A47J 27/0815
2018/0319385 A1* 11/2018 Aydemir ................. B60T 15/50

FOREIGN PATENT DOCUMENTS

| CN | 04394182 | 6/2015 | | |
| CN | 204445487 | 7/2015 | | |
| CN | 104970694 | 10/2015 | | |
| CN | 205458000 | 8/2016 | | |
| CN | 107019423 | 8/2017 | | |
| CN | 107019423 A | * 8/2017 | .......... | A47J 27/0802 |
| CN | 209186369 | 8/2019 | | |
| CN | 110430793 | 11/2019 | | |
| EP | 2342996 | 9/2011 | | |
| JP | 2006081638 | 3/2006 | | |
| KR | 200452540 Y1 | * 3/2011 | | |
| KR | 20150081948 A | * 7/2015 | | |
| RU | 160355 | 3/2016 | | |
| RU | 160355 U1 | 3/2016 | | |
| WO | WO-2018149534 A1 | * 8/2018 | .......... | A47J 27/0802 |

\* cited by examiner

ELECTRIC COOKER

CROSS-REFERENCE TO RELATED APPLICATION

This application claims the benefit of Korean Application No. 10-2017-114591 which was filed on Sep. 7, 2017, which was hereby incorporated by reference as if fully set forth herein.

BACKGROUND

1. Field of the Invention

The present disclosure relates to an electric cooker, and more specifically, to an electric cooker configured to cook in a pressurized state and a non-pressurized state of an inner pot, thereby improving the cooking quality and convenience of use.

2. Discussion of Related Art

In general, an electric cooker refers to an electric rice cooker, an electric pressure cooker, or the like used for cooking food in a restaurant or at home, and includes a main body having a heating unit and a lid for covering a top of the main body.

An inner pot for receiving food is accommodated in the main body, the lid is hinge-coupled to one side of the main body such that the lid can be opened and closed, and an inner pot cover is provided at a bottom of the lid to seal an opening of the inner pot. A flow hole configured to communicate with an inside of the inner pot may be formed at one side of the inner pot cover, and steam generated in the inner pot may flow to a pressure-adjusting unit provided in the lid through the flow hole.

In detail, the pressure-adjusting unit may include a solenoid valve electrically driven to open or close a steam discharge passage that connects the inside of the inner pot to the outside of the cooker, and a pressure relief valve for maintaining an internal pressure of the inner pot at a predetermined level. That is, when the cooking is started, the steam discharge passage is closed by the solenoid valve so that the internal pressure of the inner pot is increased, and the internal pressure of the inner pot can be maintained at a predetermined level through the pressure relief valve.

However, since the conventional electric cooker maintains the internal pressure of the inner pot at a predetermined pressure through the interaction between weight pressure of the pressure relief valve and steam pressure, it is difficult to select or apply a cooking mode suitable for a user's taste or the type of foodstuffs and thus the cooking quality is degraded.

That is, in the case of a food material which does not need to be pressurized, there is a problem wherein the texture of food is softened due to the high pressure. Meanwhile, when non-pressure cooked rice having a soft texture is preferred more than pressure cooked rice having a sticky texture, there is a problem wherein it is necessary to purchase a non-pressurized electric rice cooker or to cook the food by using a common pot.

Thus, in order to provide the rice having the soft texture, the solenoid valve is frequently opened for a predetermined time/cycle in the cooking process, the thermal power is reduced or the rice is soaked in water for a long time.

However, the taste of the rice does not reach the level of the taste of rice cooked with the non-pressurized electric rice cooker.

Further, when a pressure exists in the inner pot during the cooking, it is impossible to open the lid to check a cooking state or to insert additional materials due to a pressure safety device configured to prevent the lid from being open under the high pressurized state of the inner pot, thereby causing inconvenience to a user.

SUMMARY OF THE INVENTION

The present disclosure is directed to an electric cooker configured to cook food in a pressurized state and a non-pressurized state of an inner pot, thereby improving the cooking quality and convenience of use.

According to an aspect of the present disclosure, there is provided an electric cooker including: a main body including an inner pot configured to accommodate food and a heating unit; a lid coupled to an upper portion of the main body and opened/closed by an opening/closing unit; and a pressure switching selection unit arranged to pass through the lid and configured to switch or maintain opened/closed states to discharge internal steam from the inner pot by interworking with the opening/closing unit.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Exemplary embodiments of the present disclosure will be described in detail below with reference to the accompanying drawings. While the present disclosure is shown and described in connection with the exemplary embodiments, it will be apparent to those skilled in the art that various modifications can be made without departing from the spirit and scope of the disclosure.

Hereinafter, an electric cooker according to exemplary embodiments of the present disclosure will be described in detail with reference to the accompanying drawings.

Figure 1A:
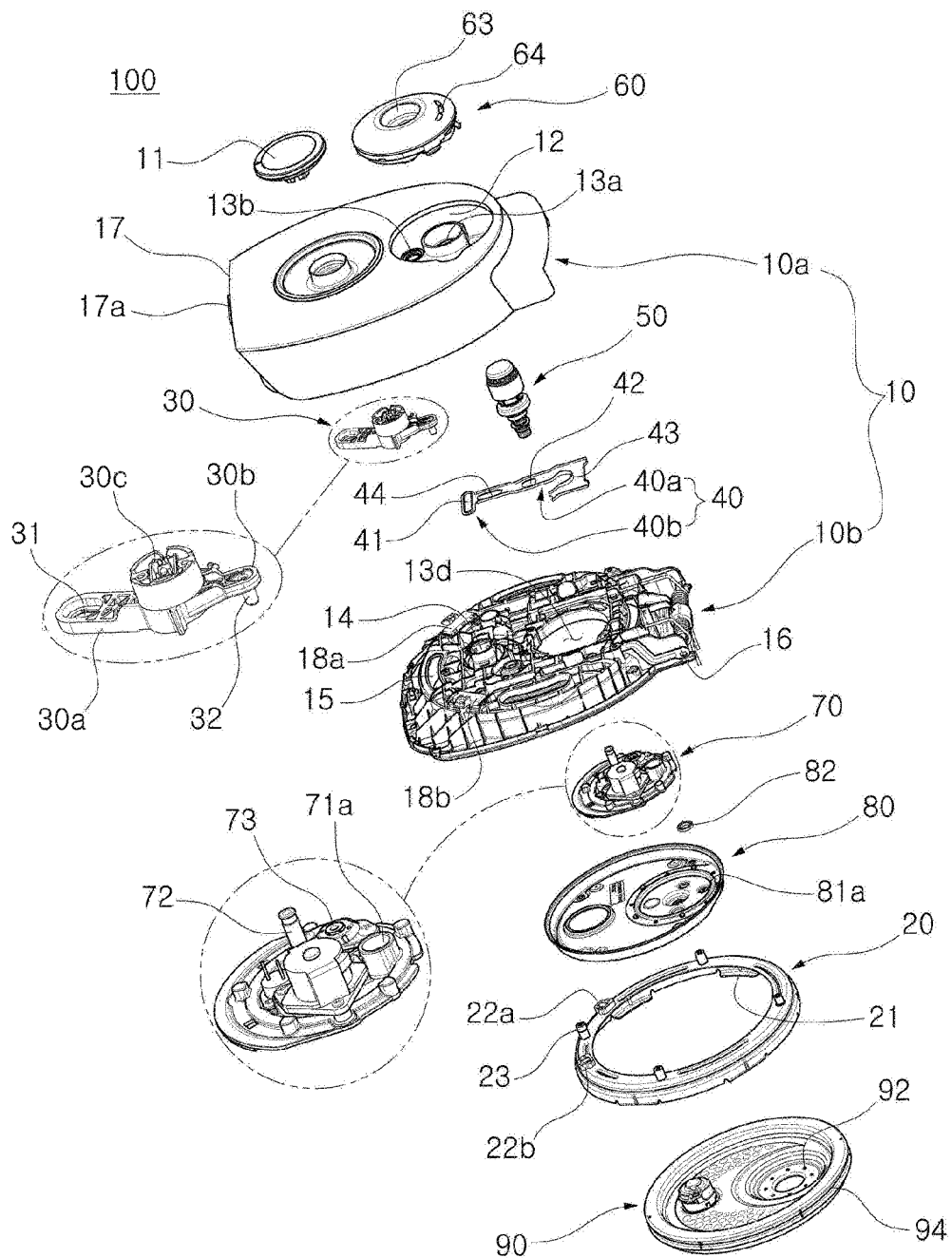
FIG. 1A is an exploded perspective view illustrating a lid of an electric cooker according to a first embodiment of the present disclosure.
Figure 1B:
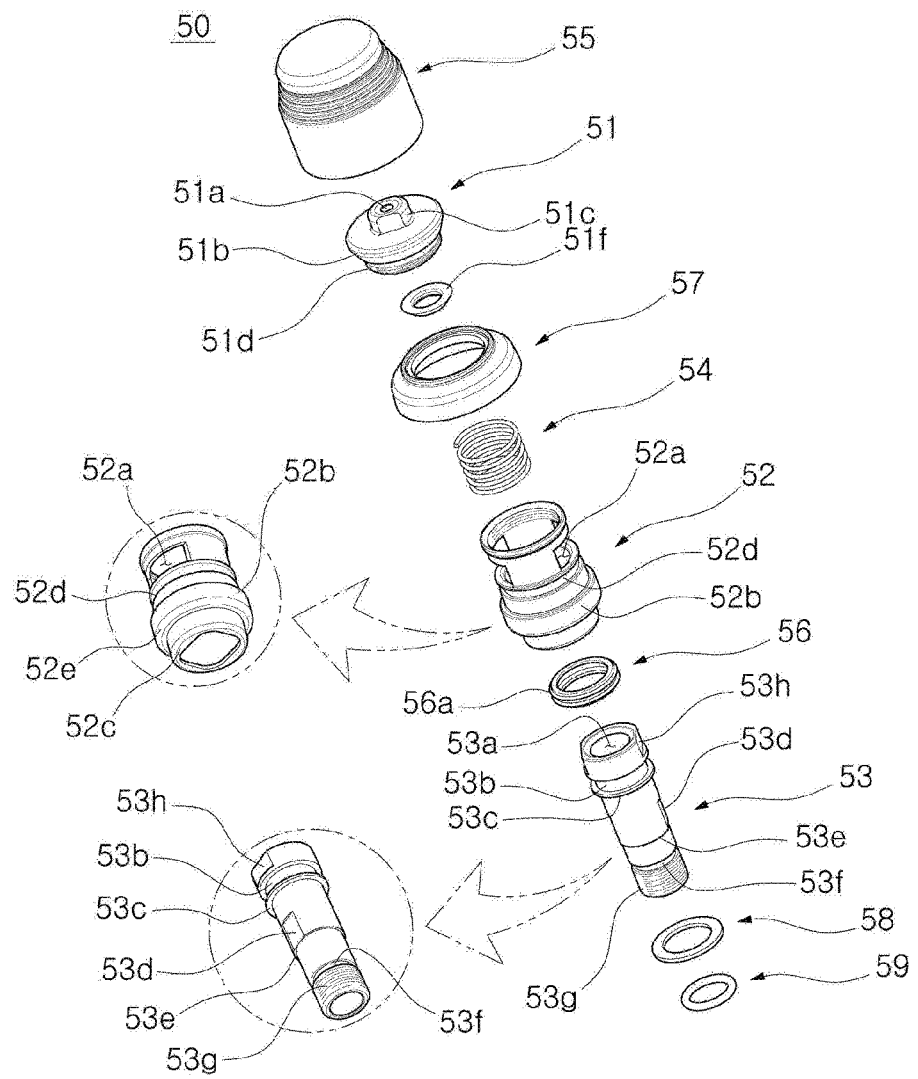
FIG. 1B is an exploded perspective view illustrating a pressure switching selection unit of the electric cooker according to the first embodiment of the present disclosure.
Figure 2A:
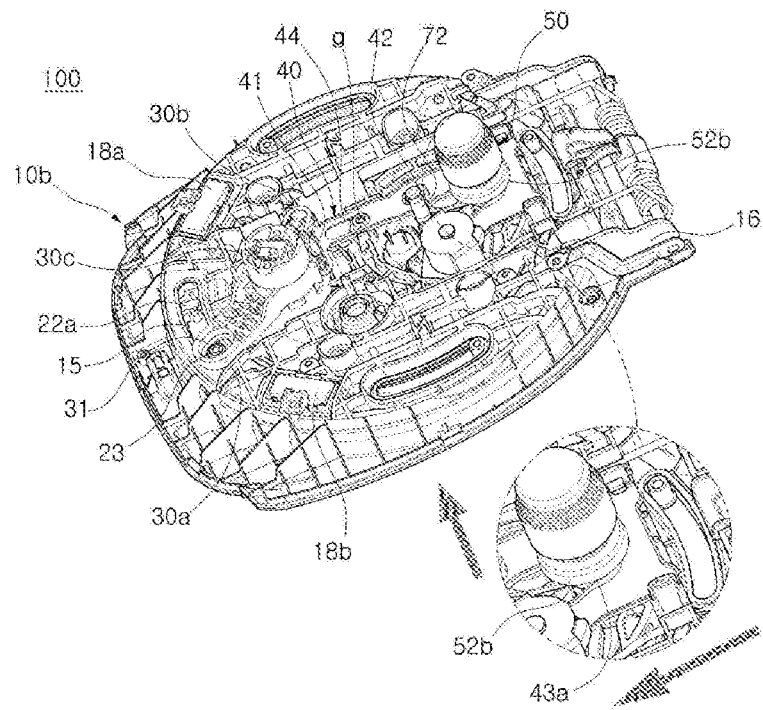
FIGS. 2A and 2B are perspective views illustrating a switching process of a pressure mode in the electric cooker according to the first embodiment of the present disclosure.
Figure 2B:
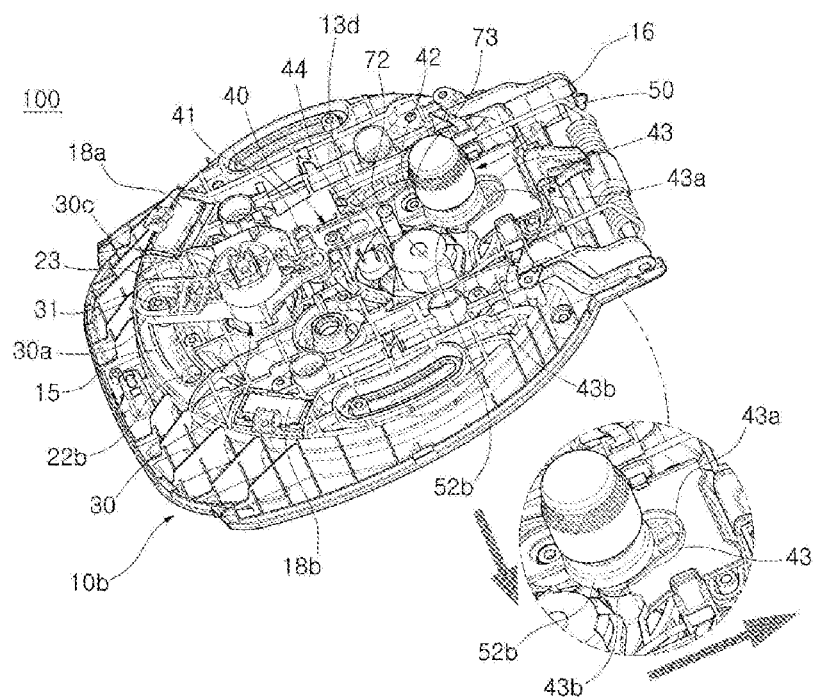
Figure 3A:
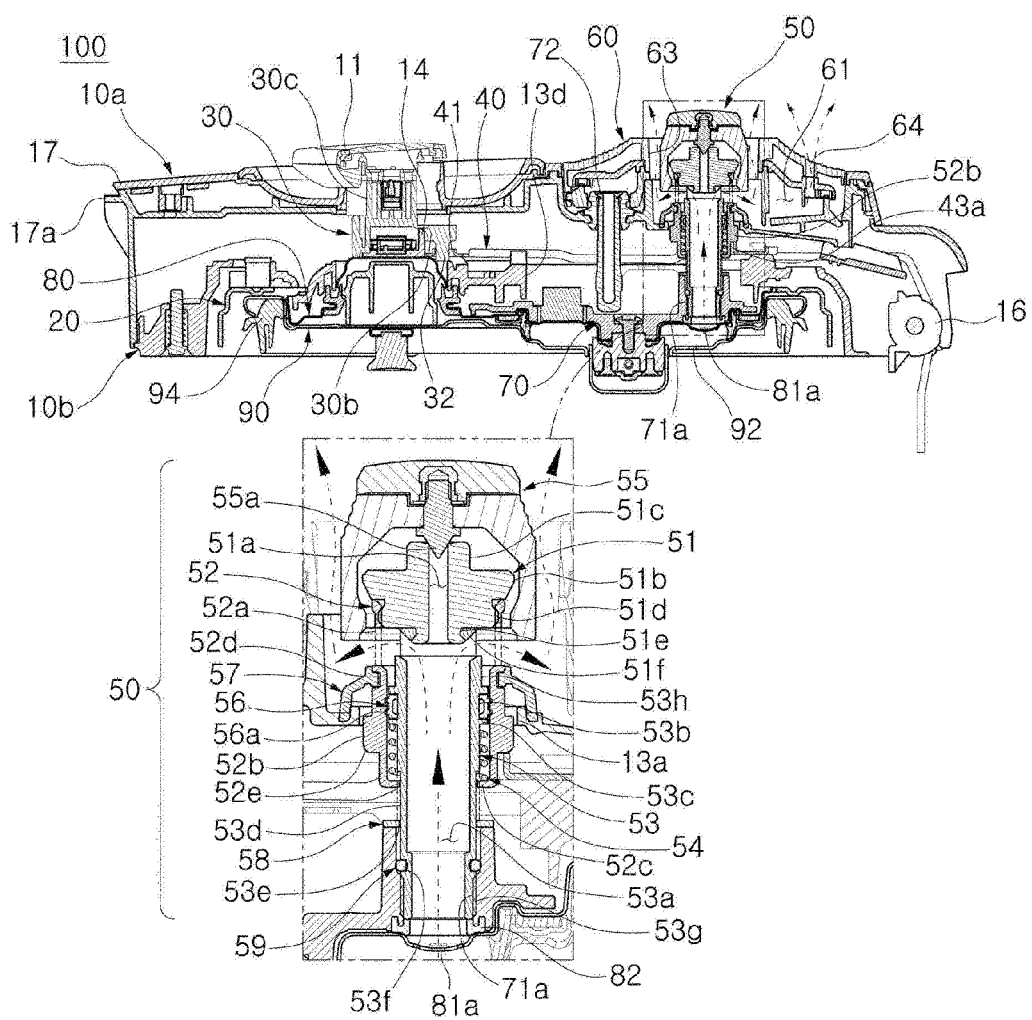
FIGS. 3A and 3B are sectional views illustrating opened/closed states of a pressure discharge passage of the electric cooker according to the first embodiment of the present disclosure.
Figure 3B:
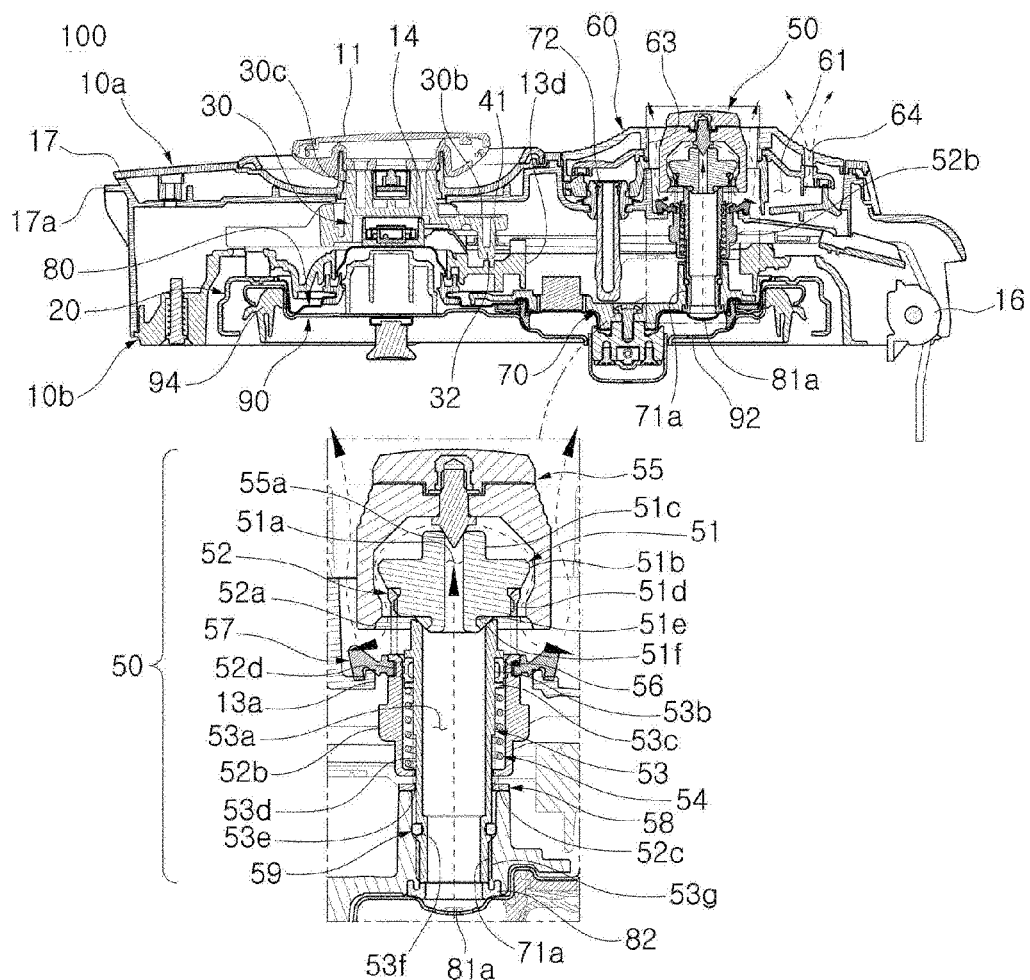
Figure 4:
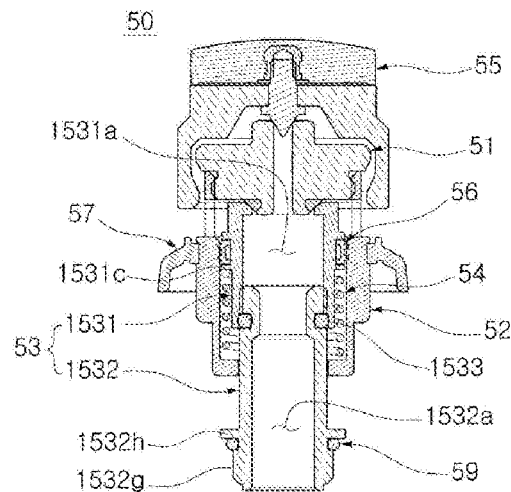
FIG. 4 is a sectional view illustrating a modified example of a base cylinder of the electric cooker according to the first embodiment of the present disclosure.

FIG. 1A is an exploded perspective view illustrating a lid of an electric cooker according to a first embodiment of the present disclosure, and FIG. 1B is an exploded perspective view illustrating a pressure switching selection unit of the electric cooker according to the first embodiment of the present disclosure. FIGS. 2A and 2B are perspective views illustrating a switching process of a pressure mode in the electric cooker according to the first embodiment of the present disclosure. FIGS. 3A and 3B are sectional views illustrating opened/closed states of a pressure discharge passage of the electric cooker according to the first embodiment of the present disclosure. FIG. 4 is a sectional view illustrating a modified example of a base cylinder of the electric cooker according to the first embodiment of the present disclosure.

As shown in FIGS. 1A to 4, an electric cooker 100 according to the present disclosure includes a main body (not shown), a lid 10, and a pressure switching selection unit 50.

A mounting space is formed in the main body (not shown), and a heating unit such as a heating plate heater or an induction heating unit is provided in the mounting space. An inner pot (not shown) for receiving food is mounted inside the mounting space. A plurality of flange portions protrude outward radially from an upper edge of the inner pot (not shown).

Meanwhile, referring to FIGS. 1A to 2A, the lid 10 is coupled to an upper portion of the main body (not shown) so as to be opened and closed and includes an inner lid portion 10b in which various electrical components and wirings are installed. In addition, the lid 10 includes an outer lid portion 10a having a handle portion 11 provided at one side of an upper surface thereof that covers the inner lid portion 10b. The handle portion 11 is illustrated as an example of an opening/closing unit. That is, the handle portion may be replaced with or may include an electric motor which interworks with an inner pot locking unit to lock the inner pot by the user's manipulation.

In the following description, one side may refer to a direction toward an open end 17 of the lid 10 and the other side may refer to a direction toward a hinge connection portion 16 of the lid 10. The handle portion 11 interworks with an inner pot locking unit configured to lock the inner pot. In the following description, an example of the inner pot locking unit configured as a locking ring will be described, but the present disclosure is not limited thereto.

In detail, the locking ring 20 is rotatably coupled to a lower surface of the inner lid portion 10b and a plurality of locking protrusions 21 protrude inward radially from an inner periphery of the locking ring 20 to correspond to the flange portions. In this case, when the locking ring 20 is rotated at an unlocking angle, each locking protrusion 21 is disposed in a space between the flange portions, and the lid 10 and the inner pot (not shown) are unlocked so that the lid 10 may be separated from the inner pot (not shown) so as to be open. In addition, when the locking ring 20 is rotated at a locking angle in a state in which the lid 10 is closed, each locking protrusion 21 is restrained by a lower end of the flange portion so that the lid 10 may be locked with the inner pot (not shown).

Referring to FIGS. 1A to 3A, a handle base portion 30 is connected to a lower end of the handle portion 11. In detail, the handle base portion 30 includes a support portion 30c connected to a lower end of the handle portion 11 as well as a locking ring interworking portion 30a and a lever interworking portion 30b which protrude from one end and the other end of the support portion 30c, respectively. The support portion 30c is coupled with the handle portion 11 by means of a key to rotate together with the handle portion 11 and an upper surface of the support portion 30c is rotatably supported on a support protrusion 14 protruding from one side of an upper surface of the inner lid portion 10b. Accordingly, the handle base portion 30 may be rotated integrally with the handle portion 11 without twisting.

In addition, the locking ring interworking portion 30a extends to overlap a rotational trace of the locking ring 20, and a connection hole 31 is formed in one side of the locking ring interworking portion 30a overlapping the locking ring 20. In this case, a connection protrusion 23 protruding from an upper surface of the locking ring 20 passes through an arc-shaped elongated hole 15 of the inner lid portion 10b to be insertion-coupled to the connection hole 31 so that the locking ring 20 may be rotated together with the handle portion 11.

Meanwhile, a lead plate 80 is coupled to a lower surface of the inner lid portion 10b and an inner pot cover 90 may be attached to a lower surface of the lead plate 80. An inner pot packing 94 is mounted on an edge of the inner pot cover 90 to seal the inside of the inner pot (not shown) when the lid 10 is closed or locked. The inner pot packing may be provided on a lower surface of the lead plate 80.

A plurality of steam flow holes 92 are formed to pass through the other side of the inner pot cover 90 to discharge steam inside the inner pot, and a communication hole 81a is formed to pass through the lead plate 80 in a region facing the steam flow holes 92.

In addition, a control plate 70 having a mounting hole 71a formed to pass therethrough and corresponding to the communication hole 81a is provided between the lead plate 80 and the inner lid portion 10b to cover the communication hole 81a. A sealing packing 82 is disposed between the communication hole 81a and the mounting hole 71a to allow the steam introduced into the communication hole 81a to correctly flow into the mounting hole 71a without leakage of steam. Alternatively, the control plate 70 may be integrally formed with the lead plate 80.

Meanwhile, an upper perforation portion 13a is formed in the other side of the outer lid portion 10a to correspond to the mounting hole 71a, and a lower perforation portion 13d is formed in the inner lid portion 10b along a region corresponding to the upper perforation portion 13a. In this case, the pressure switching selection unit 50 may be disposed to pass through the lid 10 via the upper perforation portion 13*a* and the lower perforation portion 13*d*. That is, the pressure switching selection unit 50 may be disposed to pass through at least one of the perforation portions.

In addition, a pressure discharge passage 53*a*, which is selectively opened/closed to discharge the internal steam of the inner pot, is provided inside the pressure switching selection unit 50. Further, a pressure control passage 51*a*, which is selectively opened/closed according to a level of pressure in the inner pot when the pressure discharge passage 53*a* is closed, is provided. That is, one of the opened/closed states of the pressure discharge passage 53*a* may be continuously maintained during the cooking process. When the pressure discharge passage 53*a* is closed, the pressure control passage 51*a* is repeatedly opened/closed according to the internal pressure of the inner pot during the cooking process.

Accordingly, when the pressure discharge passage 53*a* is open, the cooking may be performed in a non-pressurize cooking mode in which the steam in the inner pot is continuously discharged during the cooking. In addition, when the pressure discharge passage 53*a* is closed, the cooking may be performed in a pressurized cooking mode in which the internal pressure of the inner pot is maintained at a constant level by the pressure control passage 51*a*. Accordingly, the function of selecting the non-pressurized cooking mode or the pressurized cooking mode and the function of a general control valve for controlling the internal pressure of the inner pot in the pressurized cooking mode may be performed simultaneously using one device.

The pressure discharge passage 53*a* and the pressure control passage 51*a* are configured to be disposed in a multi-stage arrangement in series. In this case, the term 'in series' may refer to a configuration in which one end of the pressure discharge passage 53*a* is disposed to face the other end of the pressure control passage 51*a*. The arrangement of the pressure discharge passage 53*a* and the pressure control passage 51*a* is not limited to the above, but may be variously modified, such as linear/inclined/bent types as long as one end of the pressure discharge passage 53*a* is disposed to face the other end of the pressure control passage 51*a*. In detail, a lower end of the pressure discharge passage 53*a* communicates with an inside of the inner pot and an upper end of the pressure discharge passage 53*a* faces a lower end of the pressure control passage 51*a*.

When the upper end of the pressure discharge passage 53*a* is spaced apart from the lower end of the pressure control passage 51*a*, the internal steam of the inner pot may be discharged out of the lid 10 by passing through a gap between the pressure discharge passage 53*a* and the pressure control passage 51*a*. Thus, the internal steam of the inner pot can be continuously discharged through the gap without passing through the pressure control passage 51*a* so that the cooking can be performed in the non-pressurized cooking mode in which the internal pressure of the inner pot is not increased.

When the upper end of the pressure discharge passage 53*a* and the lower end of the pressure control passage 51*a* are in close contact with each other, the internal steam of the inner pot flows into the pressure control passage 51*a* through the pressure discharge passage 53*a*. That is, the closing of the pressure discharge passage 53*a* refers to a configuration in which the lower end of the pressure control passage 51*a* comes into close contact with the upper end of the pressure discharge passage 53*a*.

A pressure-responsive operating unit, such as a pressure weight 55 which is selectively opened or closed according to a pressure level, is provided at the upper end of the pressure control passage 51*a* so that the internal pressure of the inner pot may be maintained at a constant level. That is, when the pressure discharge passage 53*a* is closed, the steam inside the inner pot flows into the pressure control passage 51*a* so that the discharge of the steam is controlled. Accordingly, the internal pressure of the inner pot is increased so that the cooking is performed in the pressurized cooking mode. Further, when the internal pressure of the inner pot is increased to a certain level or more, the pressure-responsive operating unit is operated to discharge the internal steam out of the lid 10.

As described above, since the pressure discharge passage 53*a* and the pressure control passage 51*a* are arranged in series, it is possible to selectively switch the non-pressurized cooking mode and the pressurized cooking mode according to whether the steam passes through the pressure control passage 51*a*, and the internal pressure of the inner pot can be regulated. Thus, a portion directly connected to the inside of the inner pot in the pressure switching selection unit 50 is limited only to the pressure discharge passage 53*a*. Therefore, perforation structures 13*a*, 81*a*, and 71*a* formed in the lid 10, the lead plate 80, the control plate 70 and the like for communication between the pressure switching selection unit 50 and the inner space of the inner pot may be simplified. That is, the pressure discharge passage 53*a* for discharging the steam during the non-pressurized cooking and the pressure control passage 51*a* for controlling the internal pressure of the inner pot during the pressurized cooking are arranged in one perforation hole in series. Therefore, the number and area of the perforation structures, such as the upper perforation portion 13*a*, the communication hole 81*a*, and the mounting hole 71*a* formed in the lid 10, the lead plate 80, and the control plate 70 can be reduced.

As a result, design limitations of the outer lid portion 10*a* and degradation in thermal insulation performance due to a complicated perforation structure, and degradation in thermal insulation quality due to restriction of the position of the heating unit such as a lead heater (not shown) can be solved so that the quality and reliability of the product can be improved. The pressure discharge passage 53*a* may be configured to have a sectional area greater than or equal to a preset critical flow sectional area, and the pressure control passage 51*a* may be configured to have a sectional area less than the critical flow sectional area. That is, the pressure discharge passage 53*a* is configured to have a minimum sectional area greater than or equal to the critical flow sectional area, and the pressure control passage 51*a* is configured to have a maximum sectional area less than the critical flow sectional area.

The critical flow sectional area refers to an area which allows the internal pressure of the inner pot to be maintained substantially at the atmospheric pressure. The critical flow sectional area is empirically/experimentally calculated in consideration of viscosity of the steam generated when heating the inner pot and an amount of the steam produced per hour. That is, the pressure discharge passage 53*a* having an area greater than or equal to the critical flow sectional area is open. Accordingly, the steam generated during the heating of the inner pot is immediately and smoothly discharged without delay so that the internal pressure of the inner pot is maintained in a non-pressurized state similar to the pressure in the outside of the lid 10.

In addition, when the pressure discharge passage 53*a* is closed, the steam flows into the pressure control passage 51*a* so that the discharge of the steam and the steam pressure can be restricted because the pressure control passage 51a has the sectional area less than the critical flow sectional area. Accordingly, the pressure control passage 51a can maintain the internal pressure of the inner pot at a level suitable for the pressurized cooking, such as the pressure cooked rice cooking or the steamed cooking, due to the limited sectional area and selective opening/closing of the pressure control passage 51a through the pressure weight 55.

Meanwhile, a mounting groove 12 is recessed in an upper surface of the outer lid portion 10a along an edge of the upper perforation portion 13a and a steam cap portion 60 may be detachably mounted in the mounting groove 12 to guide the steam discharged from the pressure switching selection unit 50. An auxiliary perforation portion 13b may be formed to pass through the mounting groove 12 in order to install an auxiliary pressure control unit such as a solenoid valve 72. In detail, the steam cap portion 60 is formed at a central portion thereof with a discharge guide hole 63 so as to surround an upper outer periphery of the pressure switching selection unit 50 and an upper end of the solenoid valve 72 is disposed in a guide space 61 formed in the steam cap portion 60.

The steam of the pressure switching selection unit 50 may be decelerated by colliding with an inner wall surface of the discharge guide hole 63 and discharged to the outside. In addition, the steam of the solenoid valve 72 may be decelerated by colliding with a flux control rib (not shown) protruding into the guide space 61 and may be discharged to the outside through a steam guide hole 64 formed in the other side of the guide space 61. As a result, accidents such as burns due to rapid discharge of high-temperature/high-pressure steam can be prevented and steam emission noise can be minimized.

The main body (not shown) may be provided with an auxiliary locking unit for locking a locking protrusion 17a protruding from an open end 17 of the lid 10. Thus, the closed state of the lid 10 may be stably maintained even when the locking ring 20 is unlocked. Accordingly, the lid 10 can be prevented from being opened or disturbed due to the steam pressure during the cooking so that the inner pot (not shown) and the inner pot cover can be maintained in close contact with each other. Thus, the steam in the inner pot can be safely discharged through the pressure switching selection unit 50 and the steam cap portion 60.

Meanwhile, referring to FIGS. 1B to 3A, the pressure switching selection unit 50 may include a base cylinder 53, a control body portion 51, a lifting cylinder 52, and a pressure weight 55. The base cylinder 53 has a hollow structure, in which the pressure discharge passage 53a is formed in the base cylinder 53 and a spring coupling step 53c protrudes outward radially from an outer periphery of an upper portion of the base cylinder. In this case, a pressing unit 54 in the form of a coil spring is mounted on a lower end of the spring coupling step 53c.

In addition, the lifting cylinder 52 has a hollow structure having an inner diameter greater than an outer diameter of the base cylinder 53 and is configured to surround an outer periphery of the base cylinder 53. A support blade portion 52c protrudes inward radially from a lower end of the lifting cylinder 52 so as to be engaged with the outer periphery of the base cylinder 53. In detail, the base cylinder 53 equipped with the pressing unit 54 is inserted downward into an internal hollow portion of the lifting cylinder 52 from an upper portion of the lifting cylinder 52. In this case, an upper end of the pressing unit 54 is supported on a lower end of the spring coupling step 53c and a lower end of the pressing unit 54 is supported on an upper end of the support blade portion 52c. Accordingly, the lifting cylinder 52 can be coupled to the base cylinder 53 such that the lifting cylinder 52 can be elastically supported in a downward direction.

An inner end of the support blade portion 52c is processed in a D-cut shape and a D-cut portion 53d is formed on an outer periphery of the base cylinder 53 which comes into contact with the support blade portion 52c. Accordingly, the inner end of the support blade portion 52c may be slidably engaged with the D-cut portion 53d so that the lifting cylinder 52 can move up and down without being rotated.

In addition, the control body portion 51 is a block member having a circular sectional shape, in which the pressure control passage 51a is longitudinally formed to pass through an inside of the control body portion 51, and the control body portion 51 has a size greater than a sectional area of the pressure discharge passage 53a. Further, a spacing protrusion 51c protrudes from an upper surface of the control body portion 51 and an opening/closing protrusion 51e protrudes from a lower surface of the control body portion 51. The pressure control passage 51a is formed to pass through a lower surface of the opening/closing protrusion 51e from an upper surface of the spacing protrusion 51c.

Further, a cylinder coupling portion 51d, which has an outer diameter corresponding to an inner diameter of the lifting cylinder 52 and is formed with a thread along an outer periphery thereof, is provided on a lower portion of a lateral side of the control body portion 51. In addition, a coupling support step 51b having an outer diameter greater than an inner diameter of the lifting cylinder 52 is provided on an upper portion of the lateral side of the control body portion 51. The cylinder coupling portion 51d is fastened to the thread formed on the inner periphery of the upper end of the lifting cylinder 52 so that the coupling support step 51b is seated on the upper end of the lifting cylinder 52. Accordingly, the control body portion 51 and the lifting cylinder 52 can be coupled at a precise interval. The control body portion 51 may be elastically pressed downward in a state in which the control body portion 51 is coupled to the upper end of the base cylinder 53.

Since the control body portion 51 is seated on the upper end of the base cylinder 53, the control body portion 51, the base cylinder 53, the pressing unit 54, and the lifting cylinder 52 can be assembled as one module. The base cylinder 53 is disposed to pass through the lower perforation portion 13d in a state in which the lifting cylinder 52 and the control body portion 51 are assembled. In detail, the base cylinder 53 is provided at a lower portion thereof with a fastening portion 53g, which is fastened to an inner periphery of the mounting hole 71a, and a thread fastened to the thread formed on an inner periphery of the fastening portion 53g is provided on an outer periphery of the fastening portion 53g. As the fastening portion 53g is rotatably fastened to the inner periphery of the mounting hole 71a, the base cylinder 53 may be fixed.

Since the lower end of the fastening portion 53g is disposed in close contact with an edge of the communication hole 81a, the pressure discharge passage 53a may communicate with the inside of the inner pot. A D-cut grip portion 53h is provided on an outer periphery of an upper portion of the base cylinder 53 so that the fastening portion 53g can be prevented from slipping when the fastening portion 53g is rotated to be fastened.

In addition, an O-ring coupling groove 53f is formed on an upper portion of the fastening portion 53g. When the fastening portion 53g is fastened to the inner periphery of the mounting hole 71a in a state in which the sealing O-ring 59 is mounted in the O-ring coupling groove 53f, a gap between the base cylinder 53 and the mounting hole 71a can be sealed.

Further, the sealing packing 82 interposed between the control plate 70 and the lead plate 80 may have a size such that an inner peripheral portion of the sealing packing 82 faces a lower end of the fastening portion 53g. In this case, an inner peripheral portion of the sealing packing 82 is interposed between the lower end of the fastening portion 53g, which is moved downward while being fastened to the mounting hole 71a, and the edge of the communication hole 81a so that a gap between the fastening portions 53g and the edge of the communication hole 81a can be sealed. Accordingly, the steam introduced into the communication hole 81a can accurately flow toward the pressure discharge passage 53a without leakage.

When an auxiliary coupling member, such as a cylinder cap (not shown) which is hooked to an edge of a lower end of the communication hole 81a, is coupled to a lower end of the base cylinder 53, the base cylinder 53 may be fixed to the communication hole 81a. Alternatively, the base cylinder 53 may be forcibly insertion-coupled to an inner periphery of the communication hole 81a or the mounting hole 71a. In addition, mounting positions of the sealing O-ring 59 and the sealing packing 82 may be changed depending on a fixing structure of the base cylinder 53.

Further, a washer step 53e is formed between a lower end of the D-cut portion 53d and an upper portion of the O-ring coupling groove 53f, and a washer member 58 is mounted on the washer step 53e. The fastening portion 53g is fastened to the mounting hole 71a in a state in which the washer member 58 is mounted on a lower end of the washer step 53e. In this case, a portion between the washer step 53e and an edge of an upper end of the mounting hole 71a may be supported by the washer member 58. Accordingly, loosening of the sealing O-ring 59 and the sealing packing 82 due to movement of the base cylinder 53 and steam leakage caused by the loosening of the sealing O-ring 59 and the sealing packing 82 can be prevented.

As shown in FIG. 4, the base cylinder 53 may include a first base cylinder 1531 and a second base cylinder 1532. In detail, the first base cylinder 1531 and the second base cylinder 1532 may have a hollow cylindrical structure and can be assembled with each other through a screw coupling with a coupling O-ring 1533 interposed between coupling surfaces of the first and second base cylinders 1531 and 1532. An inner hollow portion 1531a of the first base cylinder 1531 and an inner hollow portion 1532a of the second base cylinder 1532 are connected to each other to form the pressure discharge passage 53a.

In addition, the first base cylinder 1531 may be formed with a spring coupling step 1531c, and the second base cylinder 1532 may be integrally formed with a washer blade portion 1532h, which substitutes for the washer member 58, along an upper portion of the fastening portion 1532g formed at a lower end of the second base cylinder 1532.

In this manner, the base cylinder 53 is divided into the first base cylinder 1531 having the spring coupling step 1531c and the second base cylinder 1532 integrally formed with the washer blade portion 1532h. Thus, the lifting cylinder 52 can be easily mounted on an outer periphery of the base cylinder 53 without the restriction of the coupling direction due to the support blade portion 52c and without separately assembling the washer member 58 so that the assembling work can be improved. Further, since the washer blade portion 1532h is integrally formed with the second base cylinder 1532, the lifting cylinder 52 can be more stably supported on the edge of the upper end of the mounting hole 71a. Referring to FIGS. 2A to 3A, an upper end of the base cylinder 53 is disposed inside a discharge guide hole 63 of the steam cap portion 60 in a state in which the fastening portion 53g is coupled with the mounting hole 71a.

Meanwhile, the opening/closing protrusion 51e may be configured to have a sectional area less than a sectional area of the pressure discharge passage 53a, and an opening/closing packing 51f may be fitted onto an outer periphery of the opening/closing protrusion 51e. A lateral side of the opening/closing protrusion 51e is gradually inclined inward radially in the downward direction such that an outer diameter of an upper edge portion of the opening/closing packing 51f is greater than an inner diameter of the pressure discharge passage 53a and an outer diameter of a lower edge portion of the opening/closing packing 51f is smaller than the inner diameter of the pressure discharge passage 53a.

Accordingly, when the control body portion 51 moves downward so that the pressure discharge passage 53a and the pressure control passage 51a are disposed closely to each other, a lateral side of the opening/closing packing 51f seals an edge of an upper end of the pressure discharge passage 53a, thereby allowing the steam introduced into the pressure discharge passage 53a to flow concentratedly to the pressure control passage 51a. The pressure weight 55 configured to open or close the pressure control passage 51a according to the level of pressure inside the inner pot is disposed at an upper end of the spacing protrusion 51c. The pressure weight 55 has a container shape that surrounds the control body portion 51. A thread, which is coupled with a thread of the coupling support step 51b of the control body portion 51, is formed at an inner periphery of a lower end of the pressure weight 55. Meanwhile, the pressure weight 55 is screw-coupled with the coupling support step 51b, and can be separated therefrom for washing by rotating the pressure weight 55 in a direction opposite a locking rotation direction.

When the thread formed at the inner periphery of the lower end of the pressure weight 55 is fastened to the thread of the coupling support step 51b to pass through the thread of the coupling support step 51b, the pressure weight 55 can move up and down while being spaced a predetermined clearance from the control body portion 51 without being completely separated from the control body portion 51. In addition, a wedge-shaped control protrusion 55a provided on an inner lower surface of the pressure weight 55 closes the pressure control passage 51a by its own weight. Accordingly, the pressure weight 55 repeatedly moves up and down according to the internal pressure of the inner pot to control the steam discharge, thereby maintaining the internal pressure of the inner pot at a certain level.

The control body portion 51 can maintain a close-contact state with the pressure discharge passage 53a by downward pressing force of the pressing unit 54 in a state in which the control body portion 51 is coupled to the lifting cylinder 52. In this case, the pressing unit 54 may have an elastic modulus corresponding to an abnormal pressure such that the pressure discharge passage 53a can be forcibly opened at the preset abnormal pressure or above. Specifically, the abnormal pressure may be set to a level greater than the internal pressure of the inner pot controlled by the pressure weight 55 in the pressurized cooking mode. That is, when the internal pressure of the inner pot is controlled by the pressure weight 55 in a state in which the pressure discharge passage 53a is closed, the lifting cylinder 52 and the control body portion 51 can be maintained in a descended state due to the downward pressing force of the pressing unit 54.

In this case, when the internal pressure of the inner pot is excessively increased due to the malfunction or failure of the pressure weight 55, the steam pressure applied to a lower surface of the control body portion 51 exceeds the elastic force of the pressing unit 54 so that the control body portion 51 moves upward and the pressure discharge passage 53a is forcibly opened. Thus, an accident due to the excessive pressure in the inner pot can be prevented.

Meanwhile, the lifting cylinder 52 is coupled to the base cylinder 53 to surround an upper periphery of the base cylinder 53 and is disposed to pass through the upper perforation portion 13a, and a pressure discharge hole 52a is formed to pass through a side wall exposed at an upper portion of the upper perforation portion 13a. Specifically, when the lifting cylinder 52 moves upward, the control body portion 51 is lifted upward and an upper end edge of the pressure discharge passage 53a is spaced apart from the opening/closing packing 51f so that the pressure discharge passage 53a can communicate with the pressure discharge hole 52a. Thus, the steam introduced into the pressure discharge passage 53a can be discharged to the outside of the lid 10 through the pressure discharge hole 52a via the steam cap portion 60.

In addition, a hole packing 57 is fitted onto an outer periphery of the lifting cylinder 52. The hole packing 57 has an inner end, which is inserted into a hole packing mounting groove 52d formed at a lower portion of the pressure discharge hole 52a, and an outer end, which extends outward radially and is bent downward so as to come into close contact with an edge of the upper perforation portion 13a. A side wall of the hole packing 57 is elastically deformed so that the sealing state to the edge of the upper perforation portion 13a can be stably maintained when the lifting cylinder 52 moves up and down.

Further, a packing mounting groove 53b is formed on an outer periphery of the base cylinder 53 at an upper portion of the spring coupling step 53c. A sliding packing 56 is mounted in the packing mounting groove 53b to seal a gap between an outer periphery of the base cylinder 53 and an inner periphery of the lifting cylinder 52. A plurality of sealing ribs 56a protrude from an outer periphery of the sliding packing 56 to maintain a stable sealing state even when the lifting cylinder 52 is lifted up and down. Thus, the steam discharged through the upper end of the pressure discharge passage 53a is not leaked toward electrical components installed inside the lid 10 or the pressing unit 54, but safely flows to the outside through the pressure discharge hole 52a and the steam cap portion 60.

Meanwhile, a lifting blade portion 52b protrudes outward radially from an outer periphery of a lower portion of the lifting cylinder 52. In addition, the lift lever portion 40 is disposed in contact with an outer periphery of the lifting cylinder 52 provided at a lower portion of the lifting blade portion 52b and moves linearly to one side and the other side corresponding to the rotation of the lever interworking portion 30b.

In detail, referring to FIGS. 1A to 2B, the lift lever portion 40 includes a connecting body portion 40b provided in a plate shape having an area covering a rotational trace of the lever interworking portion 30b. In addition, the lift lever portion 40 includes a lever body portion 40a extending from the other end of the connecting body portion 40b to come into contact with an outer periphery of the lifting cylinder 52. The lever body portion 40a may extend more than a linear movement distance of the lift lever portion 40 to maintain an overlapping state with a lower surface of the lifting blade portion 52b when the linear movement is performed.

In addition, an elongated guide hole 44 is formed to pass through one end of the lever body portion 40a adjacent to the connecting body portion 40b. The elongated guide hole 44 may be configured to extend in one direction and the other direction of the lid 10. A guide protrusion (g) protruding from an upper surface of the inner lid portion 10b is inserted into the elongated guide hole 44 so that the lift lever portion 40 can move linearly to one side and the other side.

In addition, a crank hole 41 is formed to pass through the connecting body portion 40b such that one end of a rotational trace of an interworking protrusion 32 protruding from a lower end of the lever interworking portion 30b may be inserted into the crank hole 41. The crank hole 41 extends in a tangential direction from one end of a rotational trace of the interworking protrusion 32. The rotational trace of the interworking protrusion 32 refers to a curve defined between a position of the interworking protrusion 32 when the locking ring 20 is locked and a position of the interworking protrusion 32 when the locking ring 20 is unlocked. The one end of the rotational trace may signify the position of the interworking protrusion 32 when the locking ring 20 is locked. That is, the crank hole 41 is formed in a direction perpendicular to the elongated guide hole 44 from the position of the interworking protrusion 32 when the locking ring 20 is locked.

Accordingly, when the handle base portion 30 is rotated, the interworking protrusion 32 moves in the lateral direction along the inside of the crank hole 41 while forming an arc and pulls one side edge of the crank hole 41 so that the lift lever portion 40 can move linearly to the one side. When the handle base portion 30 is rotated in reverse, the interworking protrusion 32 moves in the opposite direction while forming an arc and pushes the other edge of the crank hole 41 so that the lift lever portion 40 can move linearly to the other side.

A pin safety device 73 may be provided on the lower perforation portion 13d corresponding to a lower portion of the lever body portion 40a. In addition, a pin restricting hole 42 may be formed in the lever body portion 40a. In detail, the pin restricting hole 42 may be formed in a position facing a safety pin of the pin safety device 73 in a state in which the handle base portion 30 is rotated to lock the locking ring 20 and the lever body portion 40a is moved to the other side.

The safety pin ascends in a state in which an internal pressure of the inner pot is higher than a preset safety pressure. As the safety pin is inserted into the pin restricting hole 42, the linear movement of the lever body portion 40a is restricted, and at the same time, movement of the interworking protrusion 32 is restricted. Accordingly, the rotation of the handle base portion 30 is restricted and the locking ring 20 is prevented from being unlocked when the internal pressure of the inner pot is higher than the safety pressure, so an accident, such as the leakage of the high-pressure steam due to erroneous operation of the handle portion 11 and burns caused by the leakage of the high-pressure steam, can be prevented.

Meanwhile, the pressure discharge passage 53a is configured to be opened or closed by a link unit which interworks with the handle portion 11. In the following description, as an example, it will be described in that the link unit is provided in the lift protrusion portion 43 protruding from the lift lever portion 40. The link unit may be provided in the locking ring 20 and the handle base portion 30, which interwork with the handle portion 11. Alternatively, the link unit may be provided in various shapes according to the interworking type and position of the interworking components.

In detail, the lift protrusion portion 43 protrudes along an upper edge portion of the lever body portion 40*a* in contact with an outer periphery of the lifting cylinder 52 while facing the lifting blade portion 52*b* when the lift lever portion 40 is moved linearly. In addition, the lift protrusion portion 43 may be gradually inclined upward in the linear movement direction when the handle portion 11 is rotated to be locked. That is, the lift protrusion portion 43 has a low projecting height at a portion facing a lower surface of the lifting blade portion 52*b* in the locked state of the handle portion 11 and has a high projecting height at the portion facing the lower surface of the lifting blade portion 52*b* in the unlocked state of the handle portion 11. In detail, when the handle portion 11 is rotated to be locked, a height of a lowermost step 43*b* provided at one end of the lift protrusion portion 43 facing the lifting blade portion 52*b* is set such that the opening/closing protrusion 51*e* moves downward to close the pressure discharge passage 53*a*.

In addition, when the handle portion 11 is rotated to be unlocked, a height of an uppermost step 43*a* formed at the other end of the lift protrusion portion 43 facing the lifting blade portion 52*b* is set such that a sufficient steam flowing area may be formed between the opening/closing protrusion 51*e* and the pressure discharge passage 53*a*. Accordingly, the opened/closed states of the pressure switching selection unit 50 can be switched corresponding to the rotation of the handle portion 11. That is, as shown in FIGS. 2A and 3A, when the handle portion 11 is rotated to be unlocked in a state in which the lift lever portion 40 is moved to the other side, the lift lever portion 40 is pulled to one side, and the lifting blade portion 52*b* is pressed and slides upward along an inclined surface of the lift protrusion portion 43. A lower end edge 52*e* of the lifting blade portion 52*b* may be rounded to allow the lift protrusion portion 43, which is in contact with the lift lever portion 40 when the lift lever portion 40 is moved, to slide smoothly.

In addition, when the lifting blade portion 52*b* is supported by the uppermost step 43*a* of the lift protrusion portion 43, the pressure discharge passage 53*a* can be completely open and the open state can be maintained. In this case, the steam in the inner pot can be discharged out of the lid 10 through the steam flow hole 92, the communication hole 81*a*, the pressure discharge passage 53*a*, the pressure discharge hole 52*a*, and the steam cap portion 60. In addition, as shown in FIGS. 2B and 3B, when the handle portion 11 is rotated to be locked in a state in which the lift lever portion 40 has moved to one side, the lift lever portion 40 is pushed to the other side and the lifting blade portion 52*b* slides down along an inclined surface of the lift protrusion portion 43.

When the lifting blade portion 52*b* faces the lowermost step 43*b* of the lift protrusion portion 43, upward pressure on the lifting blade portion 52*b* is released so that the lifting cylinder 52 and the control body portion 51 move downward. Thus, an upper end of the pressure discharge passage 53*a* is closed and the pressure discharge passage 53*a* and the pressure control passage 51*a* can be integrally connected. In this case, since the descended state of the lifting cylinder 52 is maintained by the pressing unit 54, the steam in the inner pot can be selectively discharged through the pressure weight 55 so that the internal pressure of the inner pot can be maintained at a constant level.

In this manner, since the non-pressurized cooking mode for cooking food without pressure and the pressurized cooking mode for cooking food with high pressure, such as pressure cooked rice cooking, can be easily switched according to the opened/closed states of the pressure discharge passage 53*a*, various recipes can be freely used in one cooking device. In addition, since the food may be cooked according to the user's taste, such as cooking a unique sticky texture of pressure cooked rice or a unique soft texture of non-pressure cooked rice, the compatibility of the product and the cooking quality can be improved. Further, since the pressure safety device such as the pin safety device 73 is not driven in the non-pressurized cooking mode, the lid 10 can be freely opened and closed so that the input of additional material and checking of cooking conditions can be easily performed during the cooking, thereby improving the convenience of use for the product. In addition, the lifting cylinder 52 and the control body portion 51 can be moved up and down by simply rotating the handle portion 11 so that the opened/closed states of the pressure discharge passage 53*a* can be switched. Therefore, the non-pressurized cooking mode and the pressurized cooking mode can be easily selected during use and the convenience of use for the product can be significantly improved. Further, since the lift lever portion 40 that interworks with the handle portion 11 and the pressure switching selection unit 50 performs the function of preventing the opening of the inner pot at the high pressurized state, the number of components can be reduced so that the assembling work can be improved.

In addition, the steam in the inner pot can be quickly discharged through a wide steam flow area formed in the pressure discharge passage 53*a* by simply rotating the handle portion 11 in an unlocking direction. Therefore, a conventional structure, such as a tumbler pin for removing the residual pressure in the inner pot may be omitted. Further, in the non-pressurized cooking mode, the steam exhaust noise generated from a pressure relief valve during the cooking may be removed, so the quietness of the product can be improved.

Meanwhile, referring to FIG. 1A, the locking ring 20 may have a pair of markers 22*a* and 22*b* which are spaced apart from each other in a locking direction and an unlocking direction to represent the rotation direction. The markers 22*a* and 22*b* may be provided as permanent magnets, and a pair of sensor units 18*a* and 18*b* may be installed on the inner lid portion 10*b* to sense the magnetic force of the markers 22*a* and 22*b*, respectively. In detail, the first sensor unit 18*a* and the second sensor unit 18*b* are installed on an upper surface of the inner lid portion 10*b* corresponding to the rotational trace of the markers 22*a* and 22*b*. The first sensor unit 18*a* is arranged corresponding to the position of the first marker 22*a* located in the locking rotation direction of the locking ring 20 when the locking ring 20 is locked, and the second sensor unit 18*b* is arranged corresponding to the position of the second marker 22*b* located in the unlocking rotation direction of the locking ring 20 when the locking ring 20 is unlocked.

When the locking ring 20 is locked, the first sensor unit 18*a* senses the magnetic force of the first marker 22*a* and transmits a sensing signal. When the locking ring 20 is unlocked, the second sensor unit 18*b* senses the magnetic force of the second marker 22*b* and transmits a sensing signal. When the handle portion 11 is rotated to lock the locking ring 20, the pressure discharge passage 53*a* is closed corresponding to the rotation of the handle portion 11. Further, the pressure discharge passage 53*a* is opened when the handle portion 11 is rotated to unlock the locking ring 20. In this case, the sensing signals of the sensor units 18*a* and 18*b* are transmitted to a control unit and the control unit controls to activate a power supply of the main body (not shown) when the control unit receives the sensing signal from at least one of the sensor units 18a and 18b. That is, when the power supply of the main body (not shown) is activated, a heating unit, which is configured to heat the inner pot according to a cooking command input through a control panel provided in the main body, may be driven. Accordingly, the food contained in the inner pot can be cooked not only in the pressurized cooking mode in which the pressure discharge passage 53a is closed, but also in the non-pressurized cooking mode in which the pressure discharge passage 53a is open.

In addition, the control unit may inactivate the power supply of the main body (not shown) when the sensing signal is not received. Therefore, the power supply of the main body (not shown) may be activated when the locking ring 20 is locked to completely close the pressure discharge passage 53a. In addition, the power supply of the main body (not shown) may be activated when the locking ring 20 is unlocked to completely open the pressure discharge passage 53a. That is, it is possible to prevent the food from being cooked in a state in which the pressure discharge passage 53a is partially opened or closed, thereby preventing degradation of cooking quality and occurrence of accidents.

In addition, the control unit controls a cooking temperature of the inner pot through a control algorithm of a preset pressurized cooking mode when the cooking command is input in a state in which the sensing signal corresponding to the locking of the locking ring 20 is received. In this case, the control unit may control the amount of heating of the heating unit to maintain the cooking temperature suitable for pressurized cooking for pressure cooked rice and the like.

When the cooking command is input in a state in which the sensing signal corresponding to the unlocking of the locking ring 20 is received, the control unit controls the amount of heating of the heating unit through the control algorithm of the preset non-pressurized cooking mode. In this case, the control unit may control the amount of heating of the heating unit to maintain the cooking temperature suitable for the non-pressurized cooking for the non-pressure cooked rice and the like. Accordingly, the locking and unlocking of the locking ring 20 may be switched, and at the same time, the opened/closed states of the pressure discharge passage 53a may be switched by simply rotating the handle portion 11. In addition, the cooking temperature control algorithm suitable for the pressure/non-pressurized cooking mode can be automatically selected so that the product can be conveniently used and the cooking quality can be significantly improved.

Figure 5:
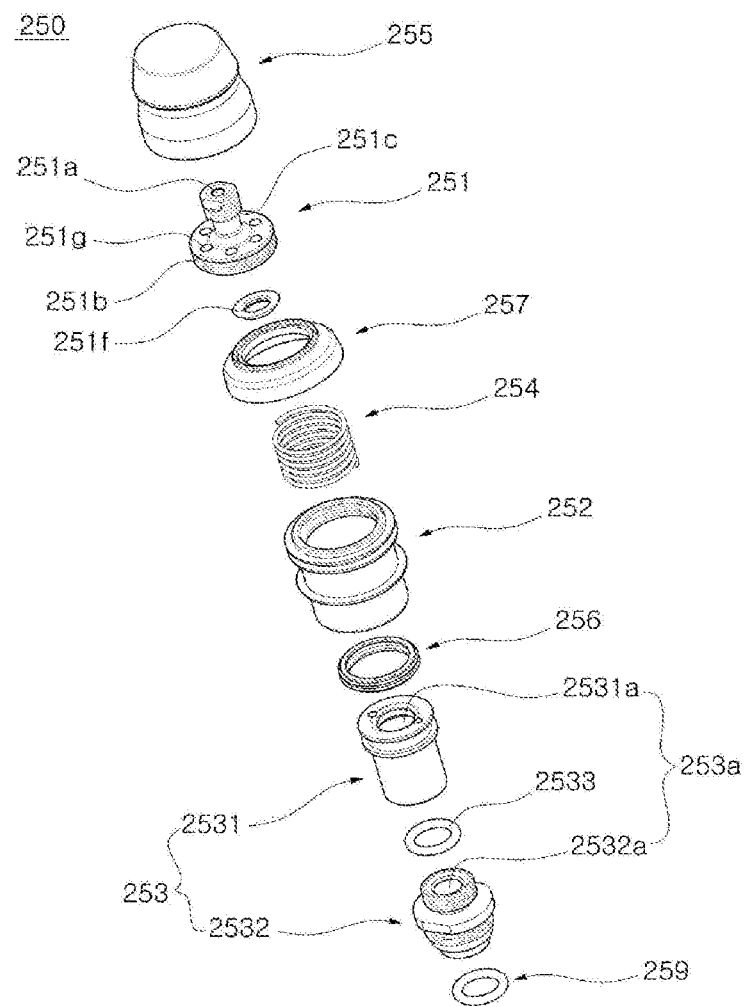
FIG. 5 is an exploded perspective view illustrating a pressure switching selection unit of an electric cooker according to a second embodiment of the present disclosure.
Figure 6A:
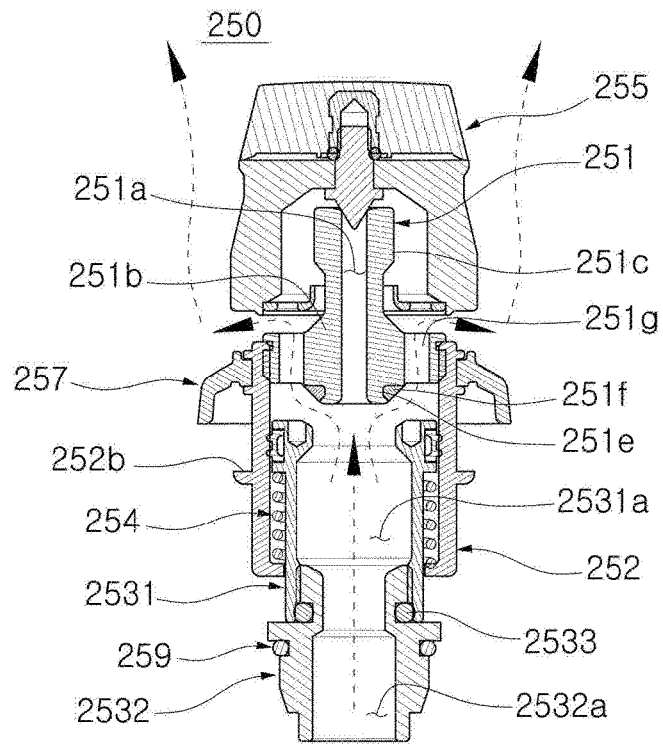
FIGS. 6A and 6B are sectional views illustrating opened/closed states of a pressure discharge passage of the electric cooker according to the second embodiment of the present disclosure.
Figure 6B:
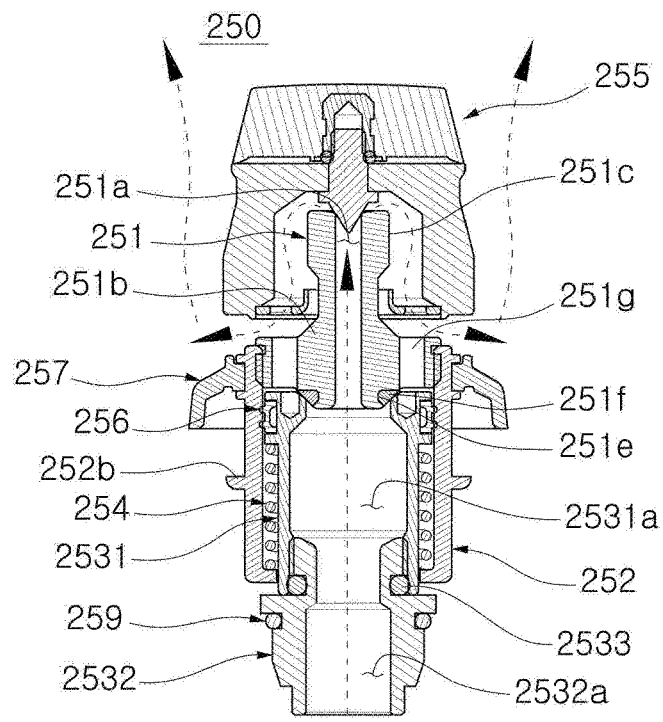

FIG. 5 is an exploded perspective view illustrating a pressure switching selection unit 250 of an electric cooker according to a second embodiment of the present disclosure, and FIGS. 6A and 6B are sectional views illustrating opened/closed states of a pressure discharge passage of the electric cooker according to the second embodiment of the present disclosure. The pressure switching selection unit 250 according to the second embodiment includes a sliding packing 256, a hole packing 257, a sealing O-ring 259, and a coupling O-ring 2533. In the second embodiment, the basic configuration is the same as that of the first embodiment described above except that a pressure discharge hole 251g is formed in a control body portion 251 to substitute for the pressure discharge hole 52a of the lifting cylinder 52, so a detailed description of the same configuration will be omitted.

Referring to FIGS. 5 and 6B, the control body portion 251 includes a mounting body portion 251b, a spacing protrusion 251c, and an opening/closing protrusion 251e. The mounting body portion 251b has a sectional area greater than a sectional area of the pressure discharge passage 253a so as to be mounted on an upper end of the base cylinder 253. The base cylinder 253 may be provided as an assembly of the first base cylinder 2531 and the second base cylinder 2532. In this case, the mounting body portion 251b may have a sectional area greater than a sectional area of a hollow portion 2531a of the first base cylinder 2531 assembled on the upper portion of the base cylinder 253. That is, the pressure discharge passage 253a may include the hollow portion 2531a of the first base cylinder 2531 and a hollow 2532a of the second base cylinder 2532. In addition, an upper end of the pressure discharge passage 253a may be an upper end of the hollow portion 2531a of the first base cylinder 2531.

Further, a thread formed on an outer periphery of the mounting body portion 251b is fastened to a thread formed on an inner periphery of an upper end of the lifting cylinder 252 and a plurality of pressure discharge holes 251g are formed in a vertical direction along a portion corresponding to an outer region of the pressure discharge passage 253a. That is, a plurality of pressure discharge holes 251g may be formed in a circumferential direction along a portion corresponding to outer regions of the opening/closing protrusion 251e and the opening/closing packing 251f which are in close contact with or inserted into an upper end edge of the pressure discharge passage 253a.

In detail, as shown in FIGS. 5 and 6B, when the pressing force applied to the lifting blade portion 252b of the lifting cylinder 252 is released, the lifting cylinder 252 and the control body portion 251 may move downward due to elastic force of the pressing unit 254. Accordingly, the opening/closing packing 251f closes the upper end edge of the pressure discharge passage 253a so that the pressure discharge passage 253a and the pressure control passage 251a can be connected to each other as a single passage. In this case, the pressure discharge hole 251g is disposed at an outer region of the opening/closing packing 251f so that the pressure discharge hole 251g does not communicate with the upper end of the pressure discharge passage 253a. Therefore, the steam flowing into the pressure discharge passage 253a flows into the pressure control passage 251a, and the discharge of the steam may be controlled by the pressure weight 255.

In addition, as shown in FIGS. 5 and 6A, when the lifting blade portion 252b is pressed upward, the lifting cylinder 252 and the control body portion 251 are moved upward and the upper end of the pressure discharge passage 253a is opened so that the pressure discharge passage 253a may communicate with the pressure discharge hole 251g. Thus, the steam introduced into the pressure discharge passage 253a can be discharged through the pressure discharge hole 251g. In this case, the spacing protrusion 251c may protrude from the center of an upper surface of the mounting body portion 251b by a length corresponding to a spacing distance of the pressure weight 255 with respect to the pressure discharge hole 251g. In this case, a sufficient steam flow space can be secured in the upper portion of the pressure discharge hole 251g.

Figure 7:
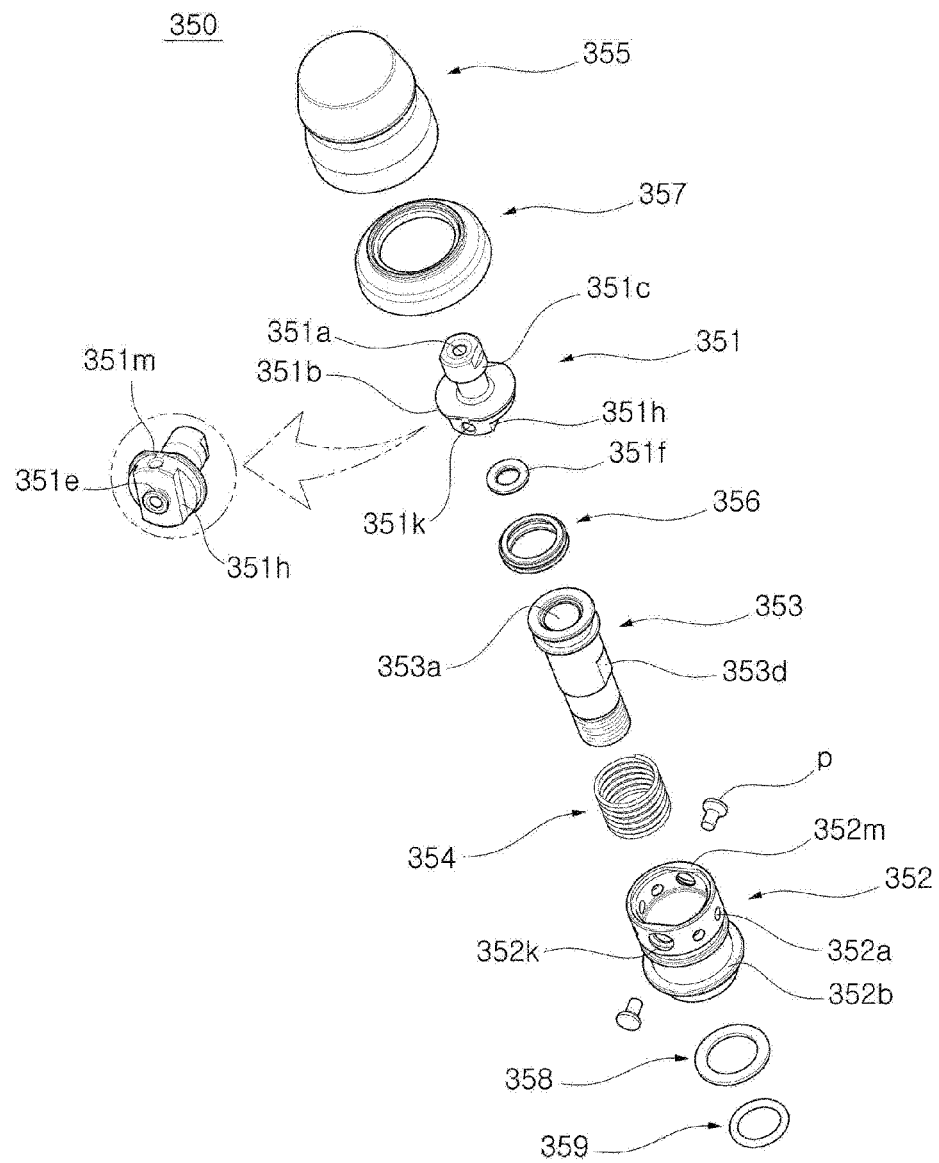
FIG. 7 is an exploded perspective view illustrating a pressure switching selection unit of an electric cooker according to a third embodiment of the present disclosure.
Figure 8:
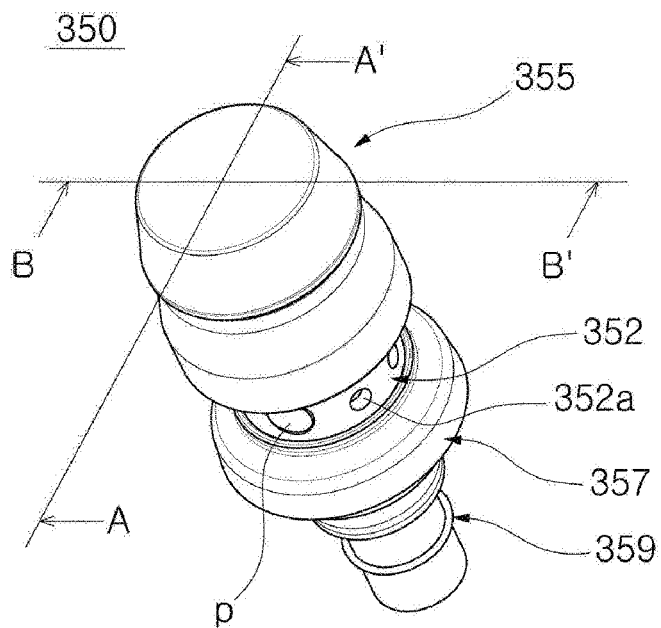
FIG. 8 is a perspective view illustrating the pressure switching selection unit of the electric cooker according to the third embodiment of the present disclosure.
Figure 9:
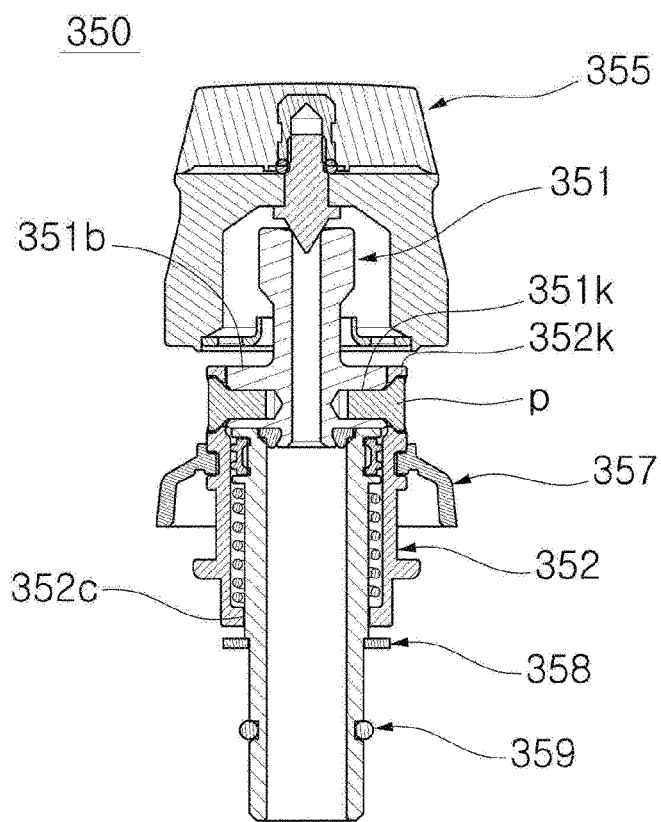
FIG. 9 is a sectional view taken along line A-A' of FIG. 8.

FIG. 7 is an exploded perspective view illustrating a pressure switching selection unit 350 of an electric cooker according to a third embodiment of the present disclosure, FIG. 8 is a perspective view illustrating the pressure switching selection unit 350 of the electric cooker according to the third embodiment of the present disclosure, FIG. 9 is a sectional view taken along line B-B' of FIG. 8, and FIGS.

10A and 10B are sectional views illustrating opened/closed states of a pressure discharge passage in a B-B' section of FIG. 8. The pressure switching selection unit 350 according to the third embodiment includes a spacing protrusion 351c, a pressing unit 354 a sliding packing 356, a hole packing 357, a washer member 358, and a sealing O-ring 359. The third embodiment is the same as the first or second embodiment except that the control body portion 351 and the lifting cylinder 352 are coupled through a screw member p, so a detailed description of the same configuration will be omitted.

As shown in FIGS. 7 to 10B, a coupling fitting portion 351m is D-cut processed on an edge of a mounting body portion 351b, and a coupling guide portion 352m corresponding to the coupling fitting portion 351m is D-cut processed on an inner periphery of an upper end of the lifting cylinder 352.

In addition, referring to FIGS. 8 to 9, a piece fastening groove 351k is formed in a lateral side of the mounting body portion 351b, and a piece fastening hole 352k corresponding to the piece fastening groove 351k is formed to pass through an upper end of the lifting cylinder 352.

The piece fastening groove 351k and the piece fastening hole 352k are aligned corresponding to each other in a state in which the coupling fitting portion 351m is engaged with the coupling guide portion 352m. In addition, the screw member p is fastened to the piece fastening portion 351k by passing through the piece fastening hole 352k so that the mounting body portion 351b can be coupled with the lifting cylinder 352. In this case, the control body portion 351 and the lifting cylinder 352 are coupled through the screw member p in a structure that does not require rotation. Therefore, different from the case where the control body portion and the lifting cylinder are rotated to be coupled, the control body portion 351 and the lifting cylinder 352 are prevented from being separated or spaced from each other during the rotation to separate the pressure weight 355. As a result, the leakage of steam, poor quality of cooking, and accidents can be prevented.

Further, the rotational force of the control body portion 351 can be delivered to the base cylinder 353 through the screw member p, the lifting cylinder 352, the support blade portion 352c, and the D-cut portion 353d without causing the separation of the control body portion 351 and the lifting cylinder 352. Thus, a module assembly of the control body portion 351, the lifting cylinder 352 and the base cylinder 353 can be easily assembled or disassembled.

Meanwhile, a plurality of pressure discharge holes 352a are formed in a lateral side of the piece fastening hole 352k so as to discharge the steam when the pressure discharge passage 353a is open. A lateral side of the mounting body portion 351b may be configured such that a portion where the piece fastening groove 351k is formed is in close contact with an inner periphery of the lifting cylinder 352. A discharge guide groove 351h, which is recessed inward radially, is formed at a portion facing the pressure discharge hole 352a. In this case, the mounting body portion 351b can be stably coupled to the lifting cylinder 352 through the screw member p in a state in which the mounting body portion 351b is in close contact with the lifting cylinder 352. In addition, a sufficient steam flow area can be provided through the discharge guide groove 351h when the pressure discharge passage 353a is open.

Figure 10A:
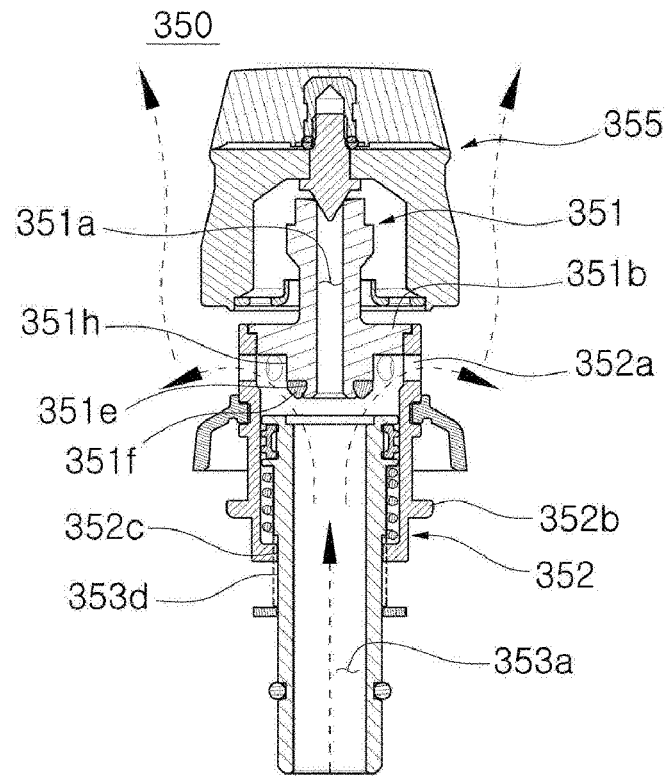
FIGS. 10A and 10B are sectional views illustrating opened/closed states of a pressure discharge passage in a B-B' section of FIG. 8.

Specifically, as shown in FIG. 10A, the lifting blade portion 352b can be pushed upward by the link unit. In this case, the opening/closing packing 351f, which is in close contact with an upper edge of the pressure discharge passage 353a, may be spaced apart from the upper edge of the pressure discharge passage 353a, and an upper end of the pressure discharge passage 353a may communicate with the pressure discharge hole 352a. In addition, a sufficient steam flow space is ensured at the upper end of the base cylinder 353 and an inner wall of an upper end of the lifting cylinder 352 through the discharge guide groove 351h formed at an outer region of the opening/closing protrusion 351e so that the steam can be smoothly discharged.

Figure 10B:
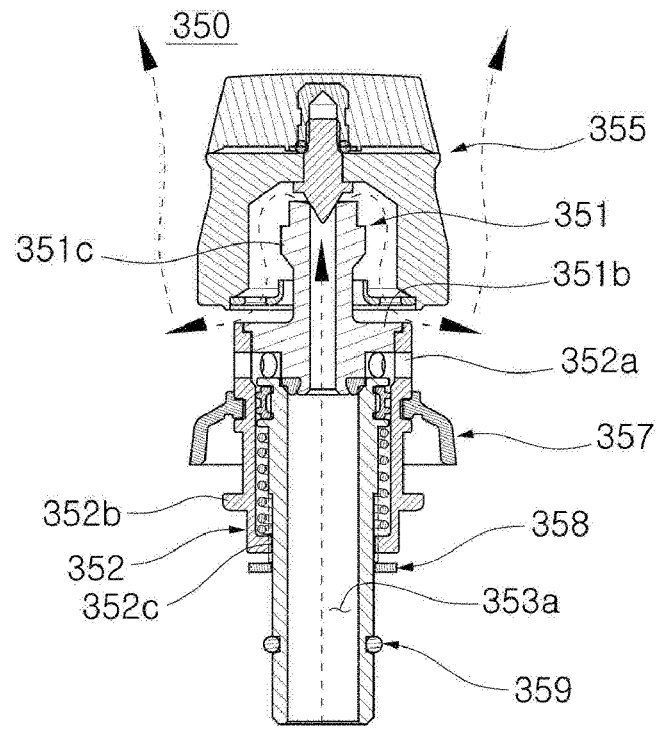

Further, as shown in FIG. 10B, when the pressing force applied to the lifting blade portion 352b is released, the opening/closing protrusion 351e is inserted into the pressure discharge passage 353a, and the opening/closing packing 351f seals the upper end edge of the pressure discharge passage 353a. Accordingly, the steam inside the inner pot may flow into the pressure control passage 351a so that the discharge of the steam can be controlled.

Figure 11:
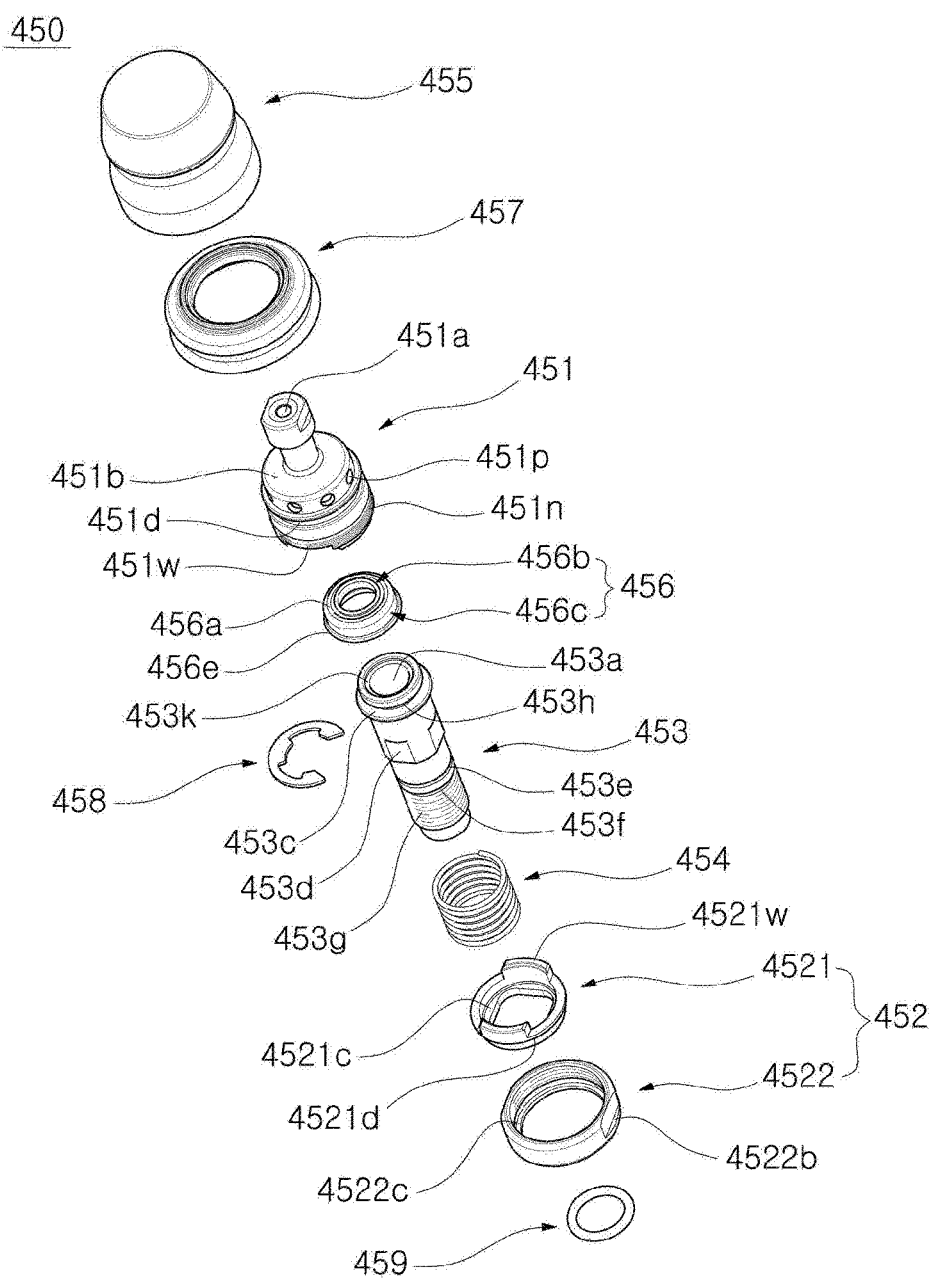
FIG. 11 is an exploded perspective view illustrating a pressure switching selection unit of an electric cooker according to a fourth embodiment of the present disclosure.
Figure 12A:
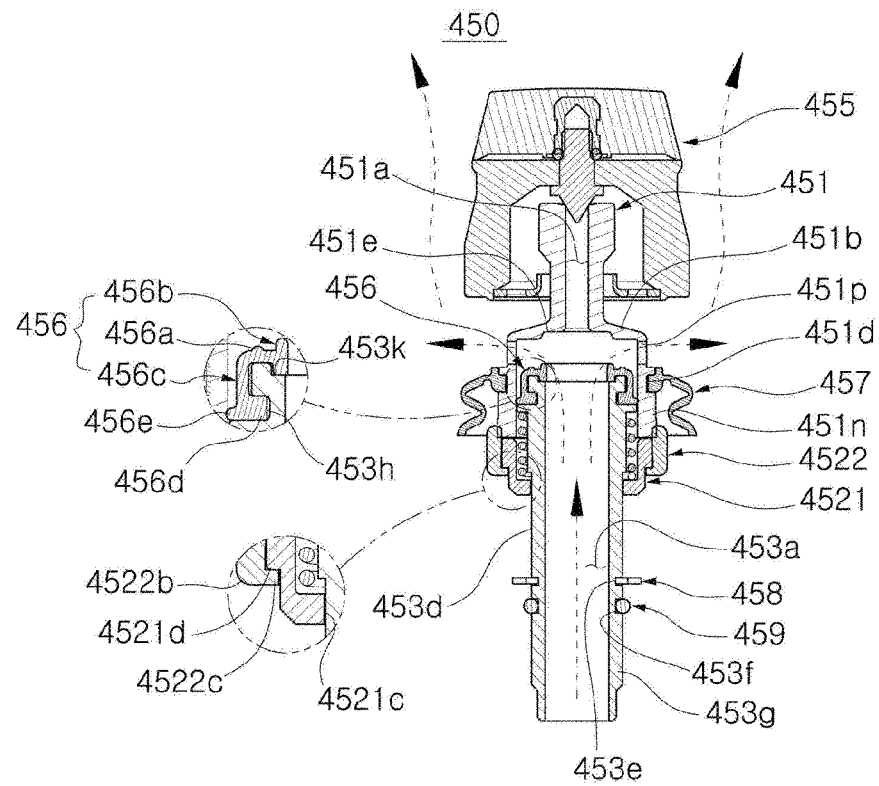
FIGS. 12A and 12B are sectional views illustrating opened/closed states of a pressure discharge passage of the electric cooker according to the fourth embodiment of the present disclosure.
Figure 12B:
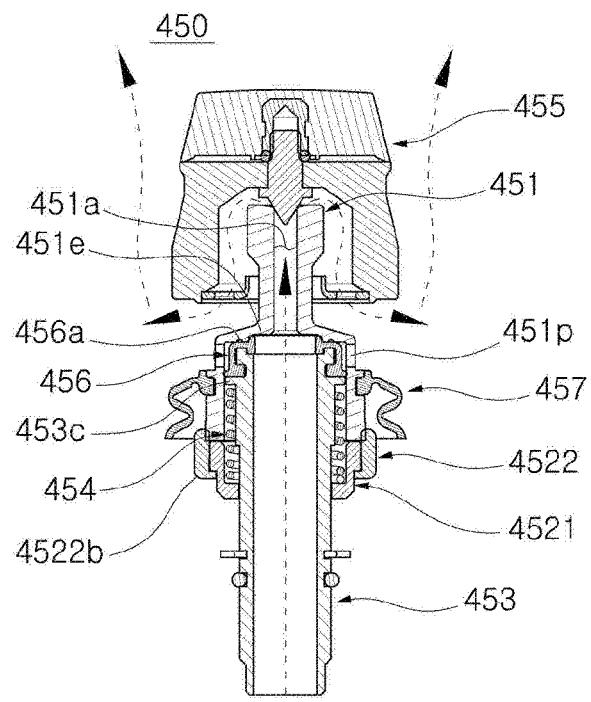

FIG. 11 is an exploded perspective view illustrating a pressure switching selection unit 450 of an electric cooker according to a fourth embodiment of the present disclosure, and FIGS. 12A and 12B are sectional views illustrating opened/closed states of a pressure discharge passage of the electric cooker according to the fourth embodiment of the present disclosure. In the fourth embodiment, the basic configuration is the same as that of the first embodiment or the second embodiment except for a coupling partition wall 451n of a control body portion 451, which extends to surround an outer periphery of an upper end of a base cylinder 453, a cover packing 456 which substitutes for a slide packing to seal a gap between the coupling partition wall 451n and the base cylinder 453, a mounting position of a hole packing 457 that seals an edge of an upper perforation portion, and a coupling structure of a lifting cylinder 452 coupled to the coupling partition wall 451n, so a detailed description of the same configuration will be omitted.

As shown in FIGS. 11 to 12B, the mounting body portion 451b is configured as a disk-shaped member having an outer diameter greater than an outer diameter of the base cylinder 453. A coupling partition wall 451n extending downward to surround an upper end of the base cylinder 453 is provided along an edge of a lower surface of the mounting body portion 451b. The lifting cylinder 452 is coupled to the control body portion 451 through the coupling partition wall 451n and may include a support body portion 4521 and a clamping body portion 4522. In detail, the support body portion 4521 is configured as a ring-shaped member having a sectional area corresponding to a lower end surface of the coupling partition wall 451n so as to support the lower end of the coupling partition wall 451n. A restricting protrusion 4521w protrudes upward from an upper end of the support body portion 4521 and a support blade portion 4521c protrudes inward radially from a lower inner periphery of the support body portion 4521. An inner end of the support blade portion 4521c may be D-cut processed so as to be engaged with a D-cut portion 453d of the base cylinder 453.

In addition, the clamping body portion 4522 is configured as a hollow cylindrical member that surrounds an outer periphery of the support body portion 4521 and has a coupling support protrusion 4522c protruding from a lower inner periphery of the clamping body portion 4522 to support a coupling support step 4521d stepped on an outer surface of the support body portion 4521. A side wall of the clamping body portion 4522 may have a height higher than an upper end of the restricting protrusion 4521w in a state in which the coupling support protrusion 4522c is in close contact with the coupling support step 4521*d*, and a thread is formed along an upper inner periphery of the clamping body portion 4522.

The base cylinder 453, which is equipped with the cover packing 456, the pressing unit 454, and the support body portion 4521, is inserted into the coupling partition wall 451*n*, and the clamping body portion 4522 is coupled with the coupling partition wall 451*n* to support the lower end of the support body portion 4521. Thus, the control body portion 451, the base cylinder 453, the pressing unit 454, the lifting cylinder 452 and the cover packing 456 can be modularized and integrally assembled. The pressing unit 454 can elastically support the lifting cylinder 452 and the control body portion 451 in the downward direction between the spring coupling step 453*c* and the support blade portion 4521*c*.

In addition, a thread formed on an inner periphery of an upper portion of the clamping body portion 4522 may be rotatably fastened to a thread formed on an outer periphery of a lower portion of the coupling partition wall 451*n* so that the clamping body portion 4522 may be fastened to the coupling partition wall 451*n*. Further, in a state in which the rotation of the support body portion 4521 is restricted through the engagement of the support blade portion 4521*c* and the D-cut portion 453*d*, the restricting protrusion 4521*w* is inserted into a restricting groove 451*w* formed on a lower portion of the coupling partition wall 451*n*. Thus, the rotation of the control body portion 451 can be restrained.

As a result, the rotational force of the control body portion 451 may be transferred to the base cylinder 453 through the restricting groove 451*w*, the restricting protrusion 4521*w*, the support blade portion 4521*c*, and the D-cut portion 453*d* of the coupling partition wall 451*n*. Thus, a modular assembly including the control body portion 451, the base cylinder 453, the lifting cylinder 452, and the cover packing 456 can be easily integrally assembled.

In addition, a washer fastening groove 453*e* is formed between the D-cut portion cut 453*d* and an O-ring coupling hole 453*f*. The washer member 458 is configured as an arc shape having one side being open and is inserted into the washer fastening groove 453*e* in a lateral direction. Further, the washer member 458 can be more stably supported on an edge of the mounting hole (see 71*a* in FIG. 1A) in a state in which the washer member 458 is restrained to upper and lower ends of an inner surface of the washer fastening groove 453*e*.

Meanwhile, when the sealing O-ring 459 is inserted into the O-ring coupling groove 453*f*, the fastening portion 453*g* is fastened to an inner periphery of the mounting hole so that a modularized pressure switching selection unit can be installed. The coupling partition wall 451*n* is disposed to pass through the upper perforation portion, and a pressure discharge hole 451*p*, which selectively communicates with an upper end of the pressure discharge passage 453*a*, is formed to pass through an upper portion of the coupling partition wall 451*n*, which is exposed at an upper portion of the upper perforation portion. The lift lever portion is disposed such that the lift protrusion portion faces the lifting blade portion 4522*b* of the clamping body portion 4522. In this case, the lifting blade portion 4522*b* is pressed upward through the lift protrusion portion so that the lifting cylinder 452 and the control body portion 451 may move upward.

In addition, as shown in FIG. 12A, when the control body portion 451 moves upward, the pressure discharge passage 453*a* and the pressure discharge hole 451*p* of the coupling partition wall 451*n* communicate with each other to discharge the steam inside the inner pot. Further, as shown in FIG. 12B, when the control body portion 451 moves downward, the pressure discharge passage 453*a* and the pressure control passage 451*a* are connected to each other so that the steam inside the inner pot flows through the pressure control passage 451*a* and can be controlled by the pressure weight 455.

As described above, since the coupling partition wall 451*n* is formed integrally with the control body portion 451, the number of components exposed on the steam discharge passage can be reduced. In addition, the corrosion resistance of the product can be improved because a screw-processed surface of components formed of stainless steel, which is difficult to form a chromium oxide film due to a low surface roughness, is not located on the steam discharge passage.

A hole packing mounting groove 451*d* is formed on an outer periphery of the coupling partition wall 451*n* along a portion corresponding to a lower portion of the pressure discharge hole 451*p*. The hole packing 457 extends outward radially in a state in which an inner end of the hole packing 457 is hooked to the hole packing mounting groove 451*d* so that an outer end of the hole packing 457, which is bent downward, is in close contact with an edge of the upper perforation hole. Accordingly, the sealing state to the edge of the upper perforation hole can be stably maintained when the control body portion 451 moves up and down.

Further, a cover packing 456 may be mounted on an upper end of the base cylinder 453 to cover an edge of the pressure discharge passage 453*a* and to come into close contact with an inner surface of the coupling partition wall 451*n*. Since the cover packing 456 is configured to surround an upper surface and a lateral side of the base cylinder 453, the cover packing 456 can seal the edge of the pressure discharge passage 453*a* when the control body portion 451 moves downward. In addition, the cover packing 456 has a function of sealing a gap between an inner surface of the coupling partition wall 451*n* and an outer periphery of the base cylinder 453 when the control body portion 451 moves up and down. As a result, the number of components can be reduced, and the assembling work and assembling productivity of the product can be improved.

The cover packing 456 includes a ring body portion 456*b* inserted into a cover coupling groove 453*k* recessed in an upper end of the base cylinder 453. In addition, the cover packing 456 includes a cover extension portion 456*c* extending outward radially from an outer periphery of the ring body portion 456*b* and bent downward to surround an upper end of the base cylinder 453. Thus, the ring body portion 456*b* can stably seal the edge of the pressure discharge passage 453*a* without moving in the radial direction in a state in which a lower end of the ring body portion 456*b* is inserted into the cover coupling groove 453*k*.

In addition, a matching groove 451*e*, which is engaged with an upper end of the ring body portion 456*b*, is formed in a lower surface of the mounting body portion 451*b*. Accordingly, when the control body portion 451 moves downward, the ring body portion 456*b* comes into close contact with a lower surface and a lateral side of the cover coupling groove 453*k*, and an upper surface and a lateral side of the matching groove 451*e*, thereby forming a wide contact area. As a result, the edge of the pressure discharge passage 453*a* can be sealed more stably.

An auxiliary sealing protrusion 456*a* may protrude from the cover extension portion 456*c* along an outer periphery of an upper portion of the control body portion 451 facing a lower surface of the control body portion 451. The auxiliary sealing protrusion 456*a* may provide an additional sealing region that surrounds an outer region of the ring body portion 456b when the matching groove 451e and the ring body portion 456b are in contact with each other. Accordingly, the edge of the pressure discharge passage 453a can be securely sealed even when elasticity of the ring body portion 456b is lowered or the control body portion 451 is eccentrically disposed.

In addition, a fixing protrusion 456d protrudes inward radially from an inner peripheral surface of the cover extension portion 456c so as to be hooked with a cover fixing groove 453h of the base cylinder 453. A packing protrusion 456e, which is in close contact with an inner surface of the coupling partition wall 451n, may protrude outward radially from an outer peripheral surface of the cover extension portion 456c facing the fixing protrusion 456d. Accordingly, the cover extension portion 456c can be prevented from moving up and down in a state in which the fixing protrusion 456d is hooked with the cover fixing groove 453h so that the close contact state between the packing protrusion 456e and the coupling partition wall 451n can be stably maintained.

The present disclosure provides the following effects.

First, since the non-pressurized cooking mode for cooking food without pressure and the pressurized cooking mode for cooking the food with high pressure, such as pressurized cooking for rice, can be easily switched according to the opened/closed states of the pressure discharge passage, various recipes can be freely used with one cooking device. In addition, since it is possible to cook a food according to the user's taste, such as a unique sticky texture of pressure cooked rice and a unique soft texture of non-pressure cooked rice, the compatibility of the product and the cooking quality can be improved.

Further, since the lid can be freely opened and closed in the non-pressurized cooking mode without the limitation caused by the pressure safety device, the input of the additional cooking material and the checking of the cooking condition can be easily performed during the cooking, thereby improving the convenience of use for the product.

Second, since the opened/closed states of the pressure discharge passage are switched corresponding to the rotation of the handle portion, the non-pressurized cooking mode and the pressurized cooking mode can be easily selected during use by simply rotating the handle portion so that the convenience of use for the product can be significantly improved.

Third, the pressure discharge passage for discharging the steam in the non-pressurized cooking mode and the pressure control passage for controlling the internal pressure of the inner pot in the pressurized cooking mode are arranged in series along one hole. As a result, the number of holes and an area for the holes can be reduced so that problems with design limitations and degradation in thermal insulation quality due to the complicated hole structure can be solved, thereby improving the reliability of the product.

Fourth, the pressing unit for maintaining the lifting piston in the descended state is configured to have an elastic force or a load corresponding to a preset abnormal pressure. Therefore, the pressure discharge passage can be stably closed at the time of pressurized cooking, and the pressure switching channel can be forcibly opened when the internal pressure of the inner pot is excessively increased due to the malfunction of the pressure-responsive operating unit so that the safety of the product can be improved.

Fifth, when the locking ring is locked and unlocked, the control unit determines the opened/closed states of the pressure discharge passage of the pressure switching selection unit through the sensing signal of the sensor unit according to the position of the marker. Thus, the cooking temperature control algorithm suitable for the non-pressurized cooking mode and the pressurized cooking mode, which are switched according to the rotation of the handle portion, can be automatically selected so that the convenience of use for the product and the cooking quality of the product can be remarkably improved.

It will be apparent to those skilled in the art that various modifications can be made to the above-described exemplary embodiments of the present disclosure without departing from the spirit or scope of the disclosure. Thus, it is intended that the present disclosure covers all such modifications provided they come within the scope of the appended claims and their equivalents.

What is claimed is:

1. An electric cooker comprising:
a main body equipped therein with an inner pot configured to accommodate food;
a lid coupled to an upper portion of the main body so as to be opened/closed;
a pressure switching selection unit arranged to pass through the lid, in which a pressure discharge passage, which is selectively opened or closed to discharge an internal steam of the inner pot, and a pressure control passage, which is selectively opened or closed according to a level of pressure inside the inner pot when the pressure discharge passage is closed, are disposed in the pressure switching selection unit in series in a multi-stage arrangement; and
a handle portion provided on an upper surface of the lid, wherein the handle portion interworks with an inner pot locking unit to lock the inner pot, and
the pressure discharge passage is opened or closed by a link unit interworkinq with the handle portion,
wherein the pressure switching selection unit comprises:
a base cylinder formed therein with the pressure discharge passage and disposed to pass through a lower surface of the lid such that a lower end of the base cylinder communicates with the inner pot;
a control body portion formed therein with the pressure control passage and disposed on an upper portion of the base cylinder;
a lifting cylinder configured to surround an outer periphery of the base cylinder, coupled to a lower end of the control body portion and moved up and down by the link unit to switch the opened/closed states of the pressure discharge passage;
a pressing unit configured to press the lifting cylinder to maintain the opened/closed states of the pressure discharge passage; and
a pressure weight provided at an end of the pressure control passage to open or close the pressure control passage according to a level of pressure inside the inner pot.

2. The electric cooker of claim 1, wherein the pressure discharge passage is configured to have a sectional area greater than or equal to a preset critical flow sectional area, and the pressure control passage is configured to have a sectional area less than the preset critical flow sectional area.

3. The electric cooker of claim 1, further comprising:
a handle base portion rotatably connected to a lower end of the handle portion and having a locking ring interworking portion at one end thereof and a lever interworking portion at the other end thereof; and
a lift lever portion disposed in contact with an outer periphery of the pressure switching selection unit and configured to move linearly to one side and the other side corresponding to rotation of the lever interworking portion,
  wherein the link unit is provided on an upper surface of the lift lever portion as a lift protrusion portion, which is disposed along a portion coming into contact with an outer periphery of the pressure switching selection unit when the lift lever portion moves linearly and is gradually inclined upward in a linear movement direction when the handle portion is rotated to be locked.

4. The electric cooker of claim 1, wherein a pressure discharge hole is formed to pass through a side wall portion of the lifting cylinder to selectively communicate with an upper end of the pressure discharge passage when the control body portion moves upward,
  the lifting cylinder is arranged to pass through an upper perforation portion formed on an upper surface of the lid, and
  a hole packing is fitted onto an outer periphery of the lifting cylinder, wherein the hole packing has an inner end in close contact with a lower portion of the pressure discharge hole and an outer end, which extends outward radially and bent downward, in close contact with an edge of the upper perforation portion.

5. The electric cooker of claim 1, wherein a lifting blade portion, which is pressed to move upward along an inclined surface of a lift protrusion portion provided on the link unit, protrudes from a lower outer periphery of the lifting cylinder, and
  an edge of the lifting blade portion is rounded such that the edge of the lifting blade portion is separated when the lift protrusion portion is divided.

6. The electric cooker of claim 1, wherein the pressing unit is configured as a coil spring having an elastic modulus corresponding to an abnormal pressure so that the pressure discharge passage is forcibly opened at a preset abnormal pressure or above,
  a spring coupling step is formed on an outer periphery of the base cylinder to support an upper end of the coil spring, and
  a support blade portion protrudes inward radially from a lower end of the lifting cylinder so as to be engaged with an outer periphery of the base cylinder and to support a lower end of the coil spring.

7. The electric cooker of claim 6, wherein a slide packing is mounted on an upper portion of the spring coupling step, and
  a plurality of ring-shaped sealing ribs protrude outward radially from an outer periphery of the slide packing to come into close contact with an inner periphery of the lifting cylinder.

8. The electric cooker of claim 6, wherein a D-cut portion is formed at an outer periphery of the base cylinder, and
  an inner end of the support blade portion is processed in a D-cut shape and slidably engaged with the D-cut portion.

9. The electric cooker of claim 1, wherein an opening/closing protrusion is provided on a lower surface of the control body portion, the opening/closing protrusion protrudes downward along an edge of the pressure control passage, and an opening/closing packing is fitted onto an outer periphery of the opening/closing protrusion to seal an edge of the pressure discharge passage when the control body portion moves downward.

10. The electric cooker of claim 1, wherein a fastening portion is provided at a lower end of the base cylinder and screw-coupled into a mounting hole of a control plate provided on a lower surface of the lid.

11. The electric cooker of claim 10, wherein a washer step is formed at an outer periphery of the base cylinder along an upper portion of the fastening portion such that a washer member is mounted on the washer step and supported by an upper end edge of the mounting hole.

12. The electric cooker of claim 10, wherein the base cylinder includes a first base cylinder disposed at a lower portion of the control body portion and a second base cylinder having the fastening portion fastened to a lower portion of the first base cylinder, and
  a washer blade portion protrudes from the second base cylinder along an upper portion of the fastening portion so as to be supported by an upper end edge of the mounting hole.

13. The electric cooker of claim 1, wherein the control body portion comprises:
  a mounting body portion formed with a plurality of pressure discharge holes extending vertically along an outer peripheral region of the pressure discharge passage; and
  a spacing protrusion protruding from an upper surface of the mounting body portion, in which the pressure weight is coupled with the spacing protrusion such that the pressure weight is spaced apart from the pressure discharge holes.

14. The electric cooker of claim 1, wherein a piece fastening groove is formed in an outer periphery of the control body portion, and an end portion of a screw member extending by passing through a side wall portion of the lifting cylinder is fastened to the piece fastening groove.

15. The electric cooker of claim 1, wherein the control body portion is provided at a lower portion thereof with a coupling partition wall which extends downward to surround the base cylinder and has a pressure discharge hole selectively communicating with an upper end of the pressure discharge passage, and
  the base cylinder is provided at an upper end thereof with a cover packing which surrounds an edge of the pressure discharge passage in close contact with an inner surface of the coupling partition wall.

16. The electric cooker of claim 15, wherein the cover packing includes a ring body portion inserted into a cover coupling groove recessed in an upper end of the base cylinder and a cover extension portion extending from an outer periphery of the ring body portion to surround an upper end of the base cylinder,
  the control body portion is formed at a lower surface thereof with a matching groove engaged with an upper end of the ring body portion, and
  a fixing protrusion hooked to a cover fixing groove of the base cylinder protrudes from an inner periphery of the cover extension portion, in which a packing protrusion in close contact with an inner surface of the coupling partition wall and an auxiliary sealing protrusion in close contact with a lower surface of the control body portion protrude from an outer periphery of the cover extension portion.

17. The electric cooker of claim 15, wherein the coupling partition wall is arranged to pass through an upper perforation portion formed on an upper surface of the lid, and
  a hole packing is mounted on an outer periphery of the coupling partition wall, in which the hole packing has an inner end in close contact with a lower portion of the pressure discharge hole and an outer end which extends outward radially and is bent downward in close contact with an edge of the upper perforation portion.

18. The electric cooker of claim 15, wherein the lifting cylinder comprises:
- a support body portion configured to support a lower end of the coupling partition wall and provided at an inner periphery thereof with a support blade portion engaged with an outer periphery of the base cylinder; and
- a clamping body portion configured to surround an outer periphery of the support body portion such that an upper end of the clamping body portion is fastened to an outer periphery of the coupling partition wall, in which a coupling support protrusion configured to support a coupling support step formed on an outer surface of the support body portion protrudes from a lower end of the clamping body portion,
- wherein a restricting protrusion protrudes from the support body portion, and a restricting groove, into which the restricting protrusion is inserted, is formed at a lower portion of the coupling partition wall to restrict rotation of the control body portion.

* * * * *